(12) United States Patent
Pascale

(10) Patent No.: US 10,343,077 B2
(45) Date of Patent: *Jul. 9, 2019

(54) VARIABLE SOUND GENERATOR

(71) Applicant: SynCon Inventures, LLC, Matthews, NC (US)

(72) Inventor: Robert Pascale, Matthews, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/948,935

(22) Filed: Apr. 9, 2018

(65) Prior Publication Data

US 2018/0229134 A1 Aug. 16, 2018

Related U.S. Application Data

(63) Continuation-in-part of application No. 13/760,940, filed on Feb. 6, 2013, now Pat. No. 9,937,429, which is a continuation-in-part of application No. 13/482,087, filed on May 29, 2012, now Pat. No. 9,937,427.

(51) Int. Cl.
*A63H 5/00* (2006.01)
*A63H 3/02* (2006.01)
*A63H 3/28* (2006.01)
*A63H 33/18* (2006.01)

(52) U.S. Cl.
CPC ............... *A63H 5/00* (2013.01); *A63H 3/02* (2013.01); *A63H 3/28* (2013.01); *A63H 33/18* (2013.01); *A63H 2200/00* (2013.01)

(58) Field of Classification Search
CPC ... A63H 3/02; A63H 3/28; A63H 5/00; A63H 33/18; A63H 2200/00
USPC ........... 446/81, 270, 297, 397, 404; 119/107
See application file for complete search history.

(56) References Cited

U.S. PATENT DOCUMENTS

| | | | | |
|---|---|---|---|---|
| 4,432,159 A | * | 2/1984 | Kanno ................ | A63H 17/268 446/410 |
| 4,662,260 A | * | 5/1987 | Rumsey ................ | A63H 5/00 446/408 |
| 5,471,192 A | * | 11/1995 | Dash ................ | A63H 3/28 340/384.3 |

(Continued)

*Primary Examiner* — Melba Bumgarner
*Assistant Examiner* — Joseph B Baldori
(74) *Attorney, Agent, or Firm* — Harvey Lunenfeld

(57) ABSTRACT

A process executing on an acceleration sensitive sound producing apparatus, comprising: generating accelerometer output signals comprising magnitude and direction of acceleration sensed by a three axis accelerometer; processing, by a microcontroller, the accelerometer output signals into a pulse width modulation timer input signal; modulating, by an interrupt timer, a pulse width modulation timer according to the pulse width modulation timer input signal; generating, by the pulse width modulation timer, a pulse width modulation timer output signal; regulating, by the pulse width modulation timer, playback speed of stored sound according to the pulse width modulation timer input signal, comprising: increasing playback speed when the magnitude of acceleration increases, decreasing playback speed when the magnitude of acceleration decreases; and/or increasing playback speed when change in the direction of acceleration increases, decreasing playback speed when change in the direction of acceleration decreases; playing back the stored sound according to the regulated playback speed.

24 Claims, 21 Drawing Sheets

(56) References Cited

U.S. PATENT DOCUMENTS

| | | | | |
|---|---|---|---|---|
| 5,674,076 A * | 10/1997 | Billings | | G10H 1/32 |
| | | | | 381/345 |
| 6,098,571 A * | 8/2000 | Axelrod | | A01K 15/025 |
| | | | | 119/707 |
| 6,150,947 A * | 11/2000 | Shima | | A63H 5/00 |
| | | | | 340/692 |
| 6,200,186 B1 * | 3/2001 | Coleman | | A23G 3/50 |
| | | | | 446/309 |
| 6,215,978 B1 * | 4/2001 | Ruzic | | A63H 5/00 |
| | | | | 273/153 R |
| 6,371,053 B1 * | 4/2002 | Tsengas | | A01K 15/025 |
| | | | | 119/707 |
| 6,431,937 B1 * | 8/2002 | Lau | | A63H 3/28 |
| | | | | 446/175 |
| 6,481,381 B2 * | 11/2002 | Ritchey | | A01K 15/025 |
| | | | | 119/708 |
| 6,578,527 B1 * | 6/2003 | Mathers | | A01K 15/025 |
| | | | | 119/707 |
| 6,892,674 B1 * | 5/2005 | Dubinins | | A01K 15/026 |
| | | | | 119/702 |
| 7,074,106 B1 * | 7/2006 | Deutsch | | A01K 15/025 |
| | | | | 119/711 |
| 7,121,230 B2 * | 10/2006 | Ritchey | | A01K 15/025 |
| | | | | 119/708 |
| 7,144,293 B2 * | 12/2006 | Mann | | A01K 15/026 |
| | | | | 446/184 |
| 8,025,550 B2 * | 9/2011 | Tsengas | | A01K 15/025 |
| | | | | 119/707 |
| 8,322,308 B2 * | 12/2012 | Curry | | A01K 15/025 |
| | | | | 119/702 |
| 8,398,451 B2 * | 3/2013 | Wolfe | | A63H 3/001 |
| | | | | 446/175 |
| 9,937,427 B2 * | 4/2018 | Pascale | | A63H 3/28 |
| 9,937,429 B2 * | 4/2018 | Pascale | | A63H 5/00 |
| 2001/0049249 A1 * | 12/2001 | Tachau | | A63H 17/34 |
| | | | | 446/397 |
| 2005/0005873 A1 * | 1/2005 | Gick | | A01K 15/025 |
| | | | | 119/707 |
| 2005/0287911 A1 * | 12/2005 | Schulze | | A63H 3/14 |
| | | | | 446/297 |
| 2006/0084360 A1 * | 4/2006 | Stern | | A01K 15/025 |
| | | | | 446/397 |
| 2006/0249096 A1 * | 11/2006 | Gick | | A01K 15/025 |
| | | | | 119/707 |
| 2008/0011244 A1 * | 1/2008 | Gick | | A01K 15/025 |
| | | | | 119/707 |
| 2010/0199924 A1 * | 8/2010 | del Pinal | | A01K 15/025 |
| | | | | 119/707 |
| 2011/0034103 A1 * | 2/2011 | Fong | | A63H 3/28 |
| | | | | 446/297 |
| 2011/0045736 A1 * | 2/2011 | Wooten | | A63H 5/00 |
| | | | | 446/397 |
| 2011/0065354 A1 * | 3/2011 | Wolfe | | A63H 3/001 |
| | | | | 446/297 |
| 2011/0195632 A1 * | 8/2011 | Chow | | A63H 3/28 |
| | | | | 446/397 |
| 2011/0244973 A1 * | 10/2011 | Brown | | A63G 31/00 |
| | | | | 472/118 |
| 2013/0324009 A1 * | 12/2013 | Pascale | | A63H 3/28 |
| | | | | 446/397 |
| 2013/0324010 A1 * | 12/2013 | Pascale | | A63H 5/00 |
| | | | | 446/397 |

* cited by examiner

| Time Frame (seconds) | 0.0 to 1.0 | 1.0 to 1.5 | 1.5 to 3.0 | 3.0 to 3.5 | 3.5 to 4.4 | 4.4 to 4.6 | 4.6 to 5.5 |
|---|---|---|---|---|---|---|---|
| Description of Force on Apparatus | At Rest | Lifted Quickly | Shaken | Thrown | Freefall | Impact | Lifted Slowly |
| Acceleration Forces by Axis (g-force) | X = 0<br>Y = 0<br>Z = 1 | X = 0.8<br>Y = 1.5<br>Z = 3.2 | X = -4 to 4<br>Y = -5.3 to 2.7<br>Z = 6.3 | X = 6<br>Y = 5.8<br>Z = 6.1 | X = 0<br>Y = 0<br>Z = 0 | X = 2<br>Y = -1<br>Z = 3 | X = 0<br>Y = 0<br>Z = 1.1 |
| Magnitude of Acceleration Vector (g-force) | 1 | 3.6 | 7.5 to 9.2 | 10.3 | 0 | 3.7 | 1.1 |
| Duty Cycle Modulation Rate (Times per Second) | 0 | 9,558 | 13,273 to 14,864 | 16,000 | 8,000 | 9,671 | 0 |

FIG. 14

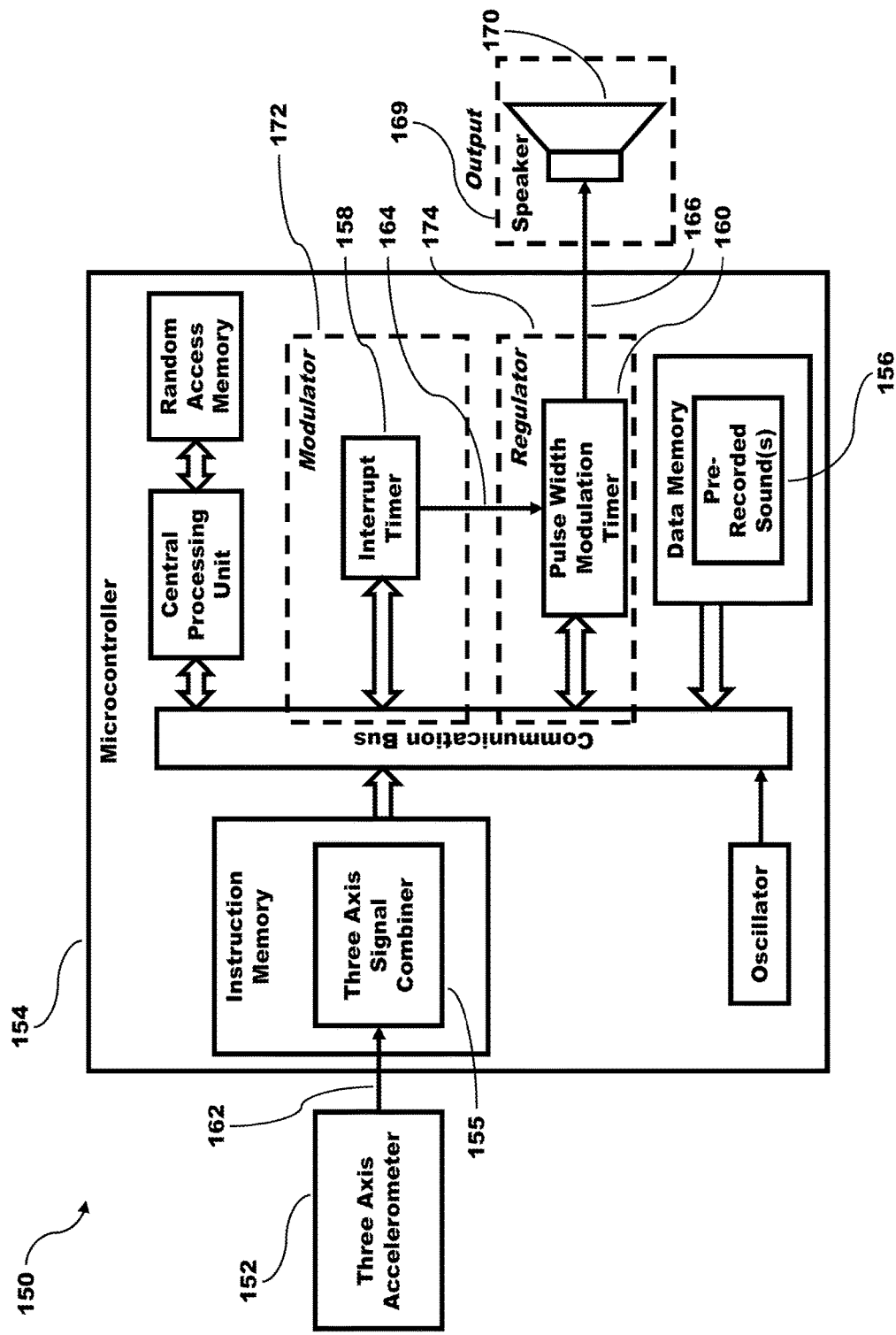

VARIABLE SOUND GENERATOR

This application is a continuation-in-part of U.S. patent application Ser. No. 13/760,940 filed Feb. 6, 2013, which is a continuation-in-part of U.S. patent application Ser. No. 13/482,087, filed May 29, 2012, the full disclosures of which all are incorporated herein by reference. The above referenced documents are not admitted to be prior art with respect to the present invention by their mention herein.

BACKGROUND OF THE INVENTION

Field of the Invention

The present invention relates generally to sound generators and more particularly to sound generators that emit sounds having characteristics dependent upon the magnitude of acceleration and direction of travel of the sound generators.

Background Art

Pet toys in the form of plush stuffed animals having internal sound generating devices activated by external pressure applied to the toys by the jaws of the pets, as the pets chew on the toys, have been known. Toys having sound generating capability are particularly well suited for use with pets, such as dogs and cats. These toys enhance the play value of the toys by creating sounds in response to the application of pressure by the pets.

Typically, the sound generating device located within the toy includes an air chamber having a port within which a reed or whistle is situated. As the pet applies pressure to the exterior of the toy, the air is squeezed out of the chamber through the port, causing the reed or whistle to emit a sound. See, for example, U.S. Pat. No. 7,144,293.

However, toys having this type of squeeze activated sound emitter are limited to producing only a single sound. Accordingly, such toys enhance the attractiveness of the toy to the pet only to a limited extent.

Another approach that has been employed is to use a prerecorded sound chip. For example, U.S. Pat. No. 6,371,053 discloses an animal toy, which has a sound chip assembly that includes a shaker barrel activator, a prerecorded sound chip and a battery. The device is designed to emit a prerecorded sound in response to movement of sound chip assembly. The sound can be a prerecorded sound such as an animal's voice (meow, prrr), a beeping sound, a human voice, other voices, user recorded voices, etc., and can last for any desired period. U.S. Pat. No. 8,025,550 discloses a similar toy, but the device also includes a cage and LED lights.

U.S. Patent Publication No. 2010/0199924 relates to a pet toy having a sound module that includes an integrated circuit, and a power source, connected to a speaker such that, upon actuation of the device through movement or otherwise, a signal is generated causing an audible sound.

U.S. Pat. Nos. 6,200,188 and 6,431,937 disclose various toys that make noises in response to movement. These patents teach devices with an electronic circuit that includes a speaker and an optical sensor or motion sensor, where the optical sensor may cause activation of the speaker driver in response to movement sensed by the optical sensor.

U.S. Pat. Nos. 6,481,381 and 7,121,230 disclose a pet-play apparatus configured for interactive use. These patents teach a cat toy that includes a toy animal, like a mouse, attached to the end of a lasso. A sonic device that includes an electronic circuit with a piezoelectric element configured to produce a prey sound when subjected to motion is employed.

U.S. Patent Publication No. 2001/0049249 discloses an interactive toy, such as a toy tank, or plane, that includes memory and a processor, where the memory stores both a number of different play scenarios, as well as a child's previous play pattern, and the toy includes one or more movable portions, such as a wing or landing gear, where a sensor detects the movement of the movable portion and the processor, coupled to the sensor and the memory, responds to a movement of the movable portion, the stored play pattern, and a play scenario by causing a sound to be synthesized in real-time.

U.S. Patent Publication No. 2011/0244973 discloses a play system accessory with a motion-activated sound module, and a support configured to be suspended from or supported on a play system with a sound module including a motion detector for detecting motion of the support and a sound-emitting device for emitting sounds in response to motion of the support.

U.S. Pat. No. 4,432,159 discloses a toy and associated noise producing mechanism. The toy has a base, and a rotating member on the base that is capable of rotating both clockwise and counterclockwise such that in response to rotation of the rotating member in a clockwise and counterclockwise direction, respectively, the rotating member contacts and engages the member and moves the member in a first and a second direction, respectively. A noise emitting mechanism is also located on the base and is operatively associated with the member. The noise emitting mechanism is capable of emitting at least two different types of noise.

U.S. Pat. No. 6,150,947 (Shima) discloses a programmable sound effects device that uses a motion-sensitive mechanism for selecting sound effects. The device comprises an electronic motion-sensitive actuator, a sound effect storage media for storing a plurality of predetermined sound effects, and a playback mechanism for audibly emitting motion activated sound effects. The device may be used with amusement and entertainment type products, such as toys, games, dolls, props, toy swords, drumsticks, and magic wands. A preferred embodiment comprises a unit that is incorporated into the handle of a toy sword. As the user moves the toy sword in a predefined manner, a motion-sensitive actuator senses motion and plays a plurality of sound effects as a function of a user's movements. A motion-detection algorithm that triggers different sound effects is programmable.

U.S. Patent Application Publication No. 2011/0195632 (Chow) discloses an electric toy, which includes a microphone for recording sound and a speaker for automatically playing back, after cessation of recording, the recorded sound at a different speed and/or different pitch.

U.S. Pat. No. 6,431,937 (Lau) discloses a toy, having a baton-like signal transmitter and a doll, including an infrared signal receiver for receiving infrared signals from the signal transmitter, in which the doll produces sound, e.g. songs, in response to signals received from the signal transmitter, and the signals are transmitted by the signal transmitter upon movement of the signal transmitter.

U.S. Pat. No. 6,215,978 (Ruzic, et al.) discloses a position-sensitive educational toy, having a dodecahedron shape with a different visual display on each planar face. A position sensing mechanism is oriented inside the toy to communicate to a microprocessor which one of the planar faces is in the "up" position. As the toy is turned or moved, a signal is generated to "power on", and a musical tune is played.

When one of the planar faces is stopped in the "up" position, the position sensing mechanism informs the microprocessor, and an aural response corresponding to the visual display is transmitted through a speaker. If the toy is left alone for a specified period of time, a warning tune is transmitted. If the toy is still not moved thereafter, the toy will automatically "power off".

U.S. Pat. No. 4,662,260 (Rumsey) discloses a sound producing ball, which produces different notes when rotated. Three orthogonally mounted gravity switches produce signals corresponding to their orientation to a reference. A multiplexer or programmable counter coupled to the switches selects one output line for each combination of states of the switches. Each output is passed through different values of resistance so that unique frequencies result. The output of the multiplexer is coupled through an oscillator to a speaker and a tone corresponding to the frequency of the output selected is produced. Multivibrators are coupled to the switches and to the oscillator to shut off the production of sound, when the device is left at rest for a certain time period.

However, none of the above disclosures teach a pet toy with an internal sound generating circuit capable of creating different sounds depending upon the direction and magnitude of motion being sensed. More particularly, none of these disclosures teach a battery powered device for use in a pet toy or the like, having an accelerometer connected to a control circuit that regulates a sound chip to cause the device to emit a sound the characteristics of which are a function of the direction and magnitude of the motion sensed by the accelerometer.

It is, therefore, an object of the present invention to provide a variable sound generator suitable for use in a toy, including a pet toy.

It is another object of the present invention to provide a variable sound generator, which includes an accelerometer capable of sensing movement in more than one direction.

It is another object of the present invention to provide a variable sound generator including a control circuit, which regulates the characteristics of the sound emitted in accordance with the direction and magnitude of movement sensed by the accelerometer.

It is another object of the present invention to provide a variable sound generator which including a control circuit which regulates the speed at which a pre-recorded sound is emitted in accordance with the direction and magnitude of movement sensed by the accelerometer.

It is another object of the present invention to provide a variable sound generator, which includes the capability to emit different pre-recorded sounds whose speed can be regulated in accordance with the direction and magnitude of movement sensed by the accelerometer.

It is another object of the present invention to provide a variable sound generator, which includes a control circuit that sets the speed at which a sound chip operates to vary the generated sound.

It is another object of the present invention to provide a variable sound generator, which includes an optional amplifier circuit for regulating the volume of the sound emitted.

It is yet another object of the present invention to provide a variable sound generator, which includes a generally spherical housing into which the sound generating circuitry is situated.

For the foregoing reasons, there is a need for a variable sound generator that has an accelerometer and a control circuit, which regulates the characteristics of sound emitted from the variable sound generator, in accordance with the direction and magnitude of movement sensed by the accelerometer.

SUMMARY

The present invention is directed to a variable sound generator comprising an accelerometer and a microcontroller, which regulates the characteristics of sound emitted from the variable sound generator in accordance with the magnitude of acceleration and/or direction of acceleration of the variable sound generator sensed by the accelerometer.

The microcontroller of the present invention determines, according to instructions provided to the microcontroller, whether to:
   increase playback speed of prerecorded sound stored in the variable sound generator when the magnitude of acceleration of the variable sound generator increases, which results in an increase in perceived pitch of the played back prerecorded sound, and
   decrease playback speed of the prerecorded sound stored in the variable sound generator when the magnitude of acceleration of the variable sound generator decreases, which results in a decrease in perceived pitch of the played back prerecorded sound; and/or
   increase playback speed of the prerecorded sound stored in the variable sound generator when change in the direction of acceleration of the variable sound generator increases, which results in an increase in perceived pitch of the played back prerecorded sound, and
   decrease playback speed of the prerecorded sound stored in the variable sound generator when the change in the direction of acceleration of the variable sound generator decreases, which results in a decrease in perceived pitch of the played back prerecorded sound.

The microcontroller increases and/or decreases the playback speed of the prerecorded sound, in accordance with the magnitude of acceleration and/or the direction of acceleration sensed by the accelerometer. The prerecorded sound is played back via a loudspeaker.

A process executing on a three axis acceleration sensitive sound producing apparatus, having features of the present invention comprises: a three axis accelerometer and a microcontroller, the microcontroller comprising at least one stored sound, an interrupt timer and a pulse width modulation timer, the process executed by motion of the apparatus sensed by the three axis accelerometer, comprises the steps of: (a) sensing, by the three axis accelerometer, the motion of the apparatus; (b) measuring, by the three axis accelerometer, acceleration associated with the sensed motion in each direction of three directions; (c) generating, by the three axis accelerometer, accelerometer output signals, comprising acceleration information, comprising magnitude of acceleration, and direction information associated with the measured sensed motion in the each direction of the three directions; (d) communicating, by the three axis accelerometer, the generated accelerometer output signals to the microcontroller; (e) receiving and processing, by the microcontroller, the communicated accelerometer output signals into a pulse width modulation timer input signal, according to the magnitude of acceleration; (f) modulating, by the interrupt timer, the pulse width modulation timer according to the pulse width modulation timer input signal, generating, by the pulse width modulation timer, a pulse width modulation timer output signal; (g) regulating, by the pulse width modulation timer, playback speed of the at least one stored sound according to the pulse width modulation timer input signal, comprising: varying the playback speed, by the pulse width modulation timer, according to the magnitude of acceleration, comprising: increasing, by the pulse width modulation timer, the playback speed when the magnitude of acceleration increases and decreasing, by the pulse width modulation timer, the playback speed when the magnitude of acceleration decreases; (h) playing back, by the microcontroller, the at least one stored sound according to the regulated playback speed.

An alternate process executing on a three axis acceleration sensitive sound producing apparatus, having features of the present invention comprises: a three axis accelerometer and a microcontroller, the microcontroller comprising at least one stored sound, an interrupt timer and a pulse width modulation timer, the process executed by motion of the apparatus sensed by the three axis accelerometer, comprises the steps of: (a) sensing, by the three axis accelerometer, the motion of the apparatus; (b) measuring, by the three axis accelerometer, acceleration associated with the sensed motion in each direction of three directions; (c) generating, by the three axis accelerometer, accelerometer output signals, comprising acceleration information, comprising magnitude of acceleration, and direction of acceleration associated with the measured sensed motion in the each direction of the three directions; (d) communicating, by the three axis accelerometer, the generated accelerometer output signals to the microcontroller; (e) receiving and processing, by the microcontroller, the communicated accelerometer output signals into a pulse width modulation timer input signal, according to the direction of acceleration; (f) modulating, by the interrupt timer, the pulse width modulation timer according to the pulse width modulation timer input signal, generating, by the pulse width modulation timer, a pulse width modulation timer output signal; (g) regulating, by the pulse width modulation timer, playback speed of the at least one stored sound according to the pulse width modulation timer input signal, comprising: varying the playback speed, by the pulse width modulation timer, according to the direction of acceleration, comprising: increasing, by the pulse width modulation timer, the playback speed when change in the direction of acceleration increases and decreasing, by the pulse width modulation timer, the playback speed when the change in the direction of acceleration decreases; (h) playing back, by the microcontroller, the at least one stored sound according to the regulated playback speed.

Another alternate process executing on a three axis acceleration sensitive sound producing apparatus, having features of the present invention comprises: a three axis accelerometer and a microcontroller, the microcontroller comprising at least one stored sound, an interrupt timer and a pulse width modulation timer, the process executed by motion of the apparatus sensed by the three axis accelerometer, comprises the steps of: (a) sensing, by the three axis accelerometer, the motion of the apparatus; (b) measuring, by the three axis accelerometer, acceleration associated with the sensed motion in each direction of three directions; (c) generating, by the three axis accelerometer, accelerometer output signals, comprising acceleration information, comprising magnitude of acceleration, and direction of acceleration associated with the measured sensed motion in the each direction of the three directions; (d) communicating, by the three axis accelerometer, the generated accelerometer output signals to the microcontroller; (e) receiving and processing, by the microcontroller, the communicated accelerometer output signals into a pulse width modulation timer input signal, according to the magnitude of acceleration and the direction of acceleration; (f) modulating, by the interrupt timer, the pulse width modulation timer according to the pulse width modulation timer input signal, generating, by the pulse width modulation timer, a pulse width modulation timer output signal; (g) regulating, by the pulse width modulation timer, playback speed of the at least one stored sound according to the pulse width modulation timer input signal, comprising: varying the playback speed, by the pulse width modulation timer, according to the magnitude of acceleration and the direction of acceleration, comprising: increasing, by the pulse width modulation timer, the playback speed when the magnitude of acceleration increases and decreasing, by the pulse width modulation timer, the playback speed when the magnitude of acceleration decreases; and increasing, by the pulse width modulation timer, the playback speed when change in the direction of acceleration increases and decreasing, by the pulse width modulation timer, the playback speed when the change in the direction of acceleration decreases; (h) playing back, by the microcontroller, the at least one stored sound according to the regulated playback speed.

The present invention comprises a device for producing sound. The device includes means for sensing movement in more than one direction, means for generating sound in response to the sensed movement and means for controlling the characteristics of the sound generated in response to the sensed movement as a function of the direction of the sensed movement.

The movement sensing means senses the magnitude of movement. The sound generating means generates sound in response to movement of a magnitude exceeding a pre-set level.

The movement sensing means senses movement in at least two directions. Preferably, the movement sensing means senses movement in three directions.

The sound generating means includes an oscillator which determines the speed at which a pre-recorded sound is processed. The control means provides a control signal which sets the oscillator to cause the sound generating means to generate a sound signal at a speed which is a function of the number of directions of sensed movement.

More specifically, the oscillator control signal causes the sound generating means to generate a sound at a first speed in response to movement in one direction. The oscillator control signal causes the sound generating means to generate a sound of at a second speed in response to movement in two directions. The oscillator control signal causes the sound generating means to generate a sound of at a third speed in response to movement in three directions.

The control means includes series connected resistors and means for bypassing selected ones of the resistors, depending upon the number of directions in which movement is sensed.

The control means includes series connected resistors, at least one of which resistors is connected in parallel with a bypass transistor, wherein the bypass transistor is not actuated when movement in one direction is sensed. The control means includes series connected resistors, at least two of which resistors are connected in parallel with bypass transistors, wherein a selected one of the bypass transistors is actuated when movement in two directions is sensed.

The control means includes series connected resistors, at least two of which resistors are connected in parallel with bypass transistors, wherein both of the bypass transistors are actuated when movement in three directions is sensed.

The device also includes a housing for enclosing the circuitry. In one embodiment of the invention, the housing is received within a pet toy, such as a plush stuffed animal.

In accordance with another aspect of the present invention, a sound generating device is provided including an accelerometer generating an output signal which is a function of the direction of sensed movement, a sound signal generating circuit, a speaker connected to the sound generating circuit for generating a sound when energized and a control circuit operably connected to control the sound signal generating circuit in accordance with the output signal of the accelerometer.

Preferably, the accelerometer is capable of sensing the direction and the magnitude of movement.

The control circuit causes the sound generating circuit to generate a sound signal to the speaker when the accelerometer senses movement of magnitude exceeding a pre-set level.

The control circuit causes the sound generating circuit to generate a sound signal to the speaker to emit a sound the characteristics of which are dependent upon the number of directions of movement sensed by the accelerometer. The device further includes a housing into which the accelerometer, the sound generating circuit, and the control circuit are situated. The housing is designed to be received within a toy. The toy is a preferably a pet toy in the form of a plush stuffed animal.

In accordance with another aspect of the present invention, a method for creating a sound is provided. The method includes: sensing movement in more than one direction; generating a sound in response to sensing movement and direction; and controlling the characteristics of the generated sound in accordance with the direction of sensed movement.

The step of sensing movement includes the steps of: sensing the magnitude of movement; and generating the sound when particular criteria are met. The step of sensing movement includes the step of sensing the direction of movement.

The criteria for generating a sound with particular characteristics are defined as a pre-configured combination of direction and/or magnitude. The step of controlling the characteristics of the generated sound includes the step of generating a sound with a different characteristic if movement is sensed that exceeds pre-determined magnitudes and/or directions. The method includes the step of controlling the speed of the generated sound by varying the setting of an oscillator in the sound generating circuit in accordance with the number of directions of sensed movement.

The method further includes the steps of creating a housing within which the movement sensing, sound generating and characteristics controlling steps are performed.

The method also includes the step of creating a toy within which the housing is received.

In accordance with another aspect of the present invention a device is provided for producing sound. The device includes means for sensing a parameter such as direction or magnitude, associated with the movement of the device. Means are provided for generating sound in response to the sensed movement. Means are provided for controlling the characteristics of the sound generated in response to the sensed movement. The controlling means includes a programmable microcontroller capable of storing and implementing a series of software commands for determining the speed and pitch of a pre-recorded sound generated by the sound generating means based upon the sensed parameter.

The microcontroller includes means for actuating the sound generating means to generate sound in two manners: 1) using a single recorded sound at one of several sound levels, which may be one or more, with each sound level having a different speed and/or pitch; 2) using multiple pre-recorded sounds, at one of several sound levels, which may be one or more, with each sound level having a different speed and/or pitch. The microcontroller includes means for causing the sound generating means to select and generate sound at a sound level when the sensed parameter exceeds a pre-configured threshold, or the sensed parameter indicates that the device is in free fall.

The microcontroller includes means for determining if the sound generating means is actuated to generate sound at the selected one of the sound levels.

The microcontroller includes means for actuating the sound generating means to generate sound at the selected one of the sound levels.

The microcontroller includes means for actuating the sound generating means to continue to generate sound at the selected one of the sound levels.

The microcontroller includes means for actuating the sound generating means to continue to generate sound at the selected one of the sound levels.

The microcontroller includes means for deactuating the sound generating means if the sensing means senses that the sensed parameter no longer exceeds any playback threshold for a pre-determined time period after the sound generating means has finished playing the recorded sound.

The microcontroller includes means for entering the "rest" mode if the sensing means senses that the sensed parameter no longer exceeds any playback threshold for a pre-determined time period after the sound generating means has finished playing the recorded sound.

The microcontroller includes means for entering the "rest" mode if the sensed parameter does not exceed the first threshold for a pre-determined time period after the sound generating means has finished playing the recorded sound.

The sensed parameter may be force magnitude and/or direction.

The microcontroller includes means for determining the number of thresholds exceeded by the sensed parameter and for actuating the sound generating means to generate sound at a selected one of multiple sound levels, depending upon the number of thresholds exceeded by the sensed parameter.

The microcontroller includes means for causing the sound generating means to select and generate sound at a zero sound level when the sensed parameter does not exceed any threshold.

The microcontroller includes means for causing the sound generating means to select and generate sound at a pre-configured sound level when the sensing means senses that the device is in free fall.

The microcontroller includes means for causing the sound generating means to select and a generate sound at a sound level which is a function of the number of thresholds exceeded by the sensed parameter.

The microcontroller includes a plurality of parameter counters, at least one of the parameter counters is associated with each of the number of thresholds exceeded by the sensed parameter, wherein a different one of the parameter counters is enabled for each of the thresholds exceeded by the sensed parameter.

The microcontroller includes means for causing the sound generating means to select and generate sound at a pre-configured sound level when said microcontroller determines that the sensed parameter indicates that the device is in free fall.

The microcontroller includes a free fall counter and means for enabling the free fall counter when the sensing means senses that the device is in free fall.

The microprocessor includes means for determining whether the sound generating means is generating sound once one of the parameter counters or the free fall counter is enabled.

The device further includes a power down counter and means for enabling the power down counter, and after a pre-set time interval, causing the microcontroller to go into the power down mode when the sound generating means is generating sound, but no thresholds have been exceeded.

The device further includes software interrupt counters and means for enabling the power down counters, when the sound generating means is generating sound, and at least one of the parameter counters and the free fall counters is enabled, the software interrupt timers being enabled using the corresponding sound level, wherein the at least one of the parameter counters and the free fall counters are set to a pre-determined number of cycles.

The microcontroller includes means for entering the power down mode after a pre-set time period, if the sound generating means is not generating sound.

The microcontroller includes means for exiting the power down mode upon one of the parameter counters and the free fall counter being enabled. The microcontroller includes a data buffer, and wherein the microcontroller includes means for determining if the sound generating means should generate sound and has sufficient data in the buffer to do so, and the software interrupt timers are timed out.

The microcontroller comprises means for decoding enough additional data to prevent a buffer under-run, if the sound generating means does not have enough data in the buffer to generate sound.

In accordance with another aspect of the present invention, a method is provided for generating sound in a device. The device includes means for sensing a parameter associated with the movement of the device, means for generating sound in response to the sensed movement, and means for controlling the characteristics of the sound generated in response to the sensed movement. The controlling means includes a programmable microcontroller capable of storing and implementing a series of software commands for determining the speed and pitch of a pre-recorded sound generated by the sound generating means based upon the sensed parameter.

The method includes: actuating the sound generating means to generate sound at a selected one of either one or several sound levels, wherein each of the sound levels having a different speed and/or pitch. The sound generating means is caused to select and generate sound at a sound level when the sensed parameter exceeds a pre-determined threshold or the sensed parameter indicates that the device is in free fall. The device determines if the sound generating means is actuated to generate sound at the selected one of the sound levels. If not, the sound generating means is actuated.

The sound generating means continues to generate sound at the selected one of the sound levels, if the sound generating means is already actuated, unless the sensing means senses a change in the sensed parameter.

The sound generating means is deactuated if the sensing means senses that the sensed parameter no longer exceeds any playback threshold for a pre-determined time period after the sound generating means has finished playing the recorded sound.

The microcontroller goes into "rest" mode if the sensing means senses that the sensed parameter no longer exceeds any playback threshold for a pre-determined time period after the sound generating means has finished playing the recorded sound.

The sensed parameter is force magnitude and/or direction.

The combination of magnitude and/or direction of the force relayed by the sensed parameter is determined. The sound generating means is actuated to generate sound at a selected one of multiple sound levels, depending upon the particular combination of thresholds exceeded by the sensed parameter.

Each one of the selected sound levels has a different speed and/or pitch.

Multiple sounds can be pre-recorded so that they can be selected based on pre-configured criteria and the sound levels may be applied to said sounds.

Sound levels may be applied to any, all, or none of the pre-recorded sounds.

The sound generating means is caused to select and generate sound at a zero sound level when the sensed parameter does not exceed any threshold.

The sound generating means is caused to select and generate sound at a particular sound level when the sensing means senses that the device is in free fall.

The sound generating means is caused to select and generate sound at a particular sound level which is a function of the combination of thresholds exceeded by the sensed parameter.

The microcontroller includes a plurality of parameter counters, at least one of the parameter counters being associated with each of the combination of thresholds exceeded by the sensed parameter. A different one of the parameters counters is enabled for each of the thresholds exceeded by the sensed parameter.

The sound generating means is caused to select and generate sound at a particular sound level when the microcontroller determines that the sensed parameter indicates that the device is in free fall.

The microcontroller has a free fall counter. The free fall counter is enabled when the sensing means senses that the device is in free fall.

If the sound generating means is generating sound once one of the parameter counters or the free fall counter is enabled, but no thresholds have been exceeded, a power down counter is enabled, and after a pre-set time interval, the microcontroller is caused to go into the power down mode.

The software interrupt timers are enabled and set using the corresponding sound level. At least one of the parameter counters and the free fall counter is set to a pre-determined number of cycles.

The microcontroller is caused to enter the power down mode after a pre-set time period, if the sound generating means is not generating sound.

The microcontroller is caused to exit the power down mode upon one of the parameter counters or the free fall counter being enabled.

The microcontroller includes a data buffer. It determines if the sound generating means should generate sound and has sufficient data in the data buffer to do so. If the sound generating means does not have enough data in the data buffer to generate sound, the microcontroller decodes enough additional data to prevent a buffer under-run.

When the parameter sensed is direction, the characteristics of the generated sound are controlled in accordance with the direction of sensed movement.

When the parameter sensed is the magnitude of movement, sound is generated when the magnitude of movement exceeds a pre-determined level.

DRAWINGS

These and other features, aspects, and advantages of the present invention will become better understood with regard to the following description, appended claims, and accompanying drawings where:

FIG. 14 is a schematic representation in tabular form of typical acceleration forces, magnitude of acceleration force vectors, and duty cycle modulation rates for typical forces acting on the variable sound generator;

FIG. 15 is another more detailed block diagram of the alternate embodiment of the variable sound generator of FIG. 9, showing portions of a typical microcontroller;

Figure 9:
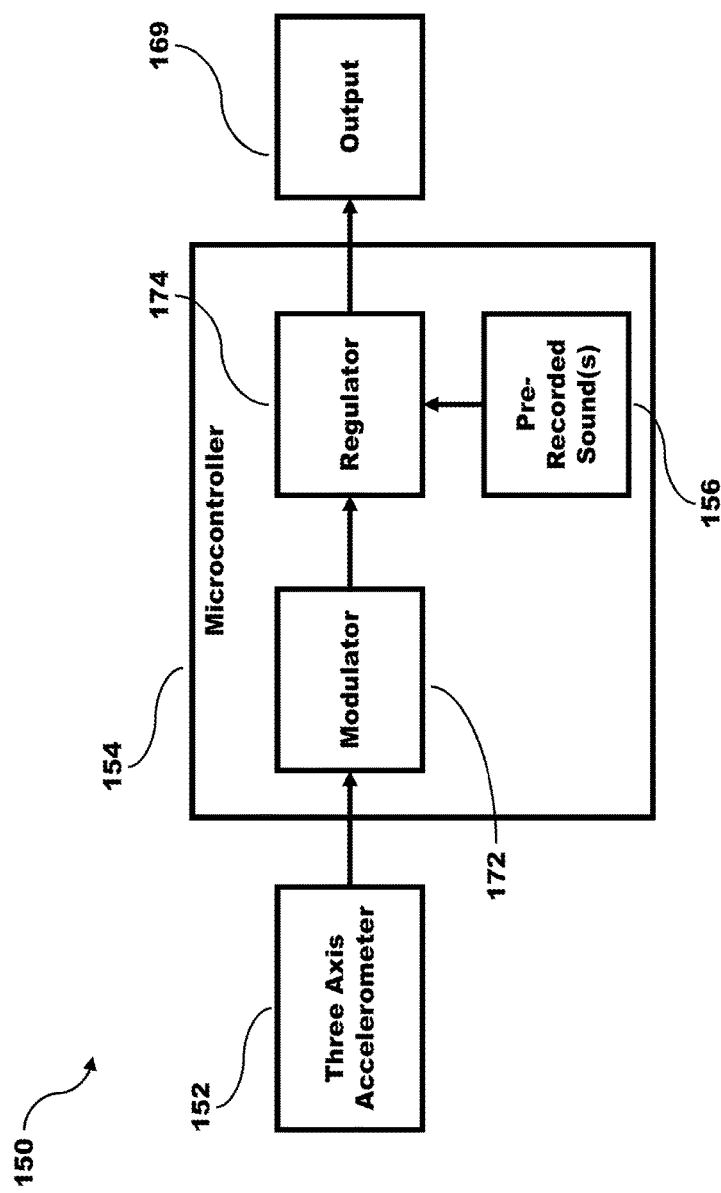
FIG. 9 is a block diagram of an alternate embodiment of a variable sound generator of the present invention, constructed in accordance with the present invention.
Figure 21:
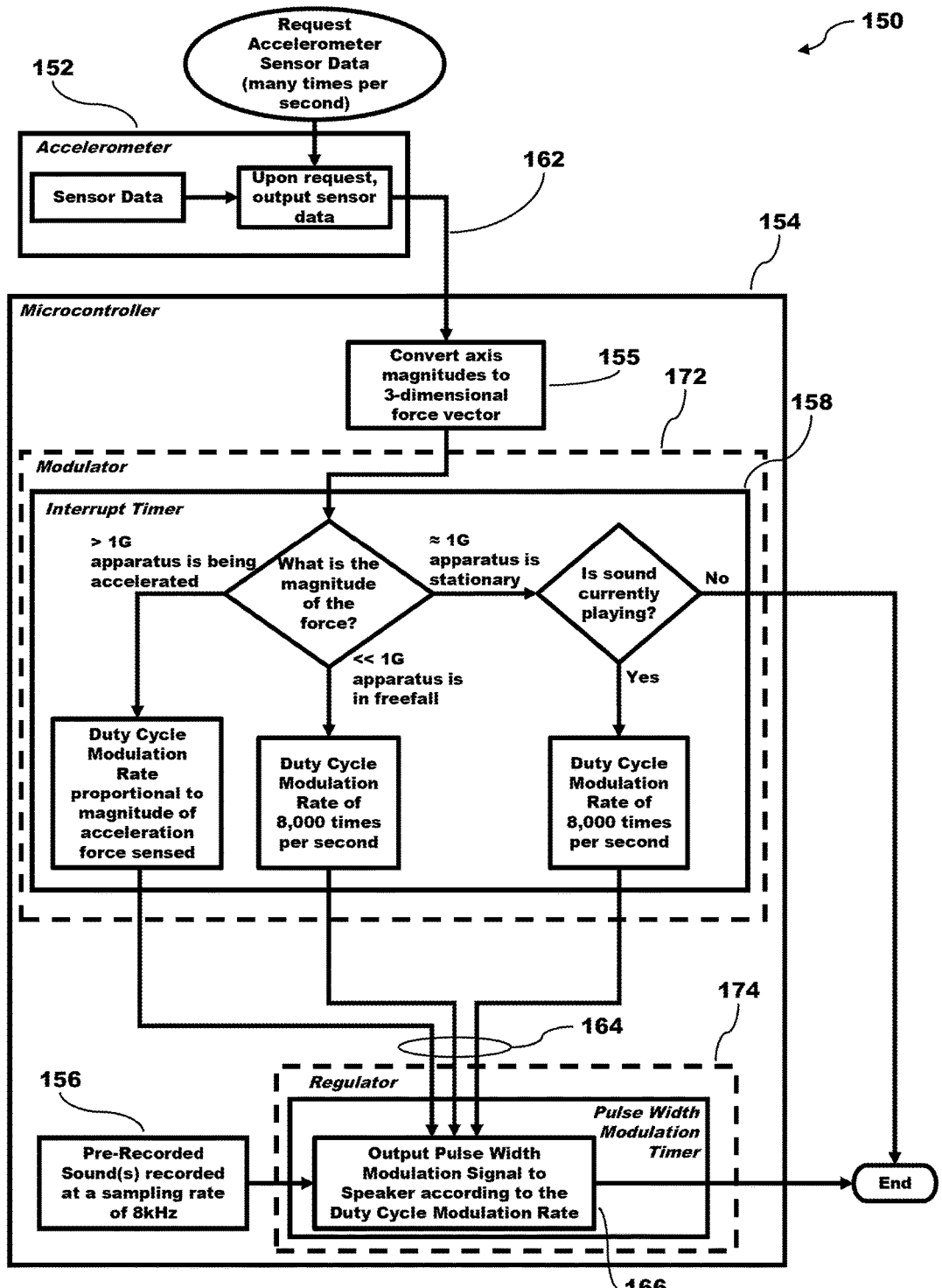
Figure 22:
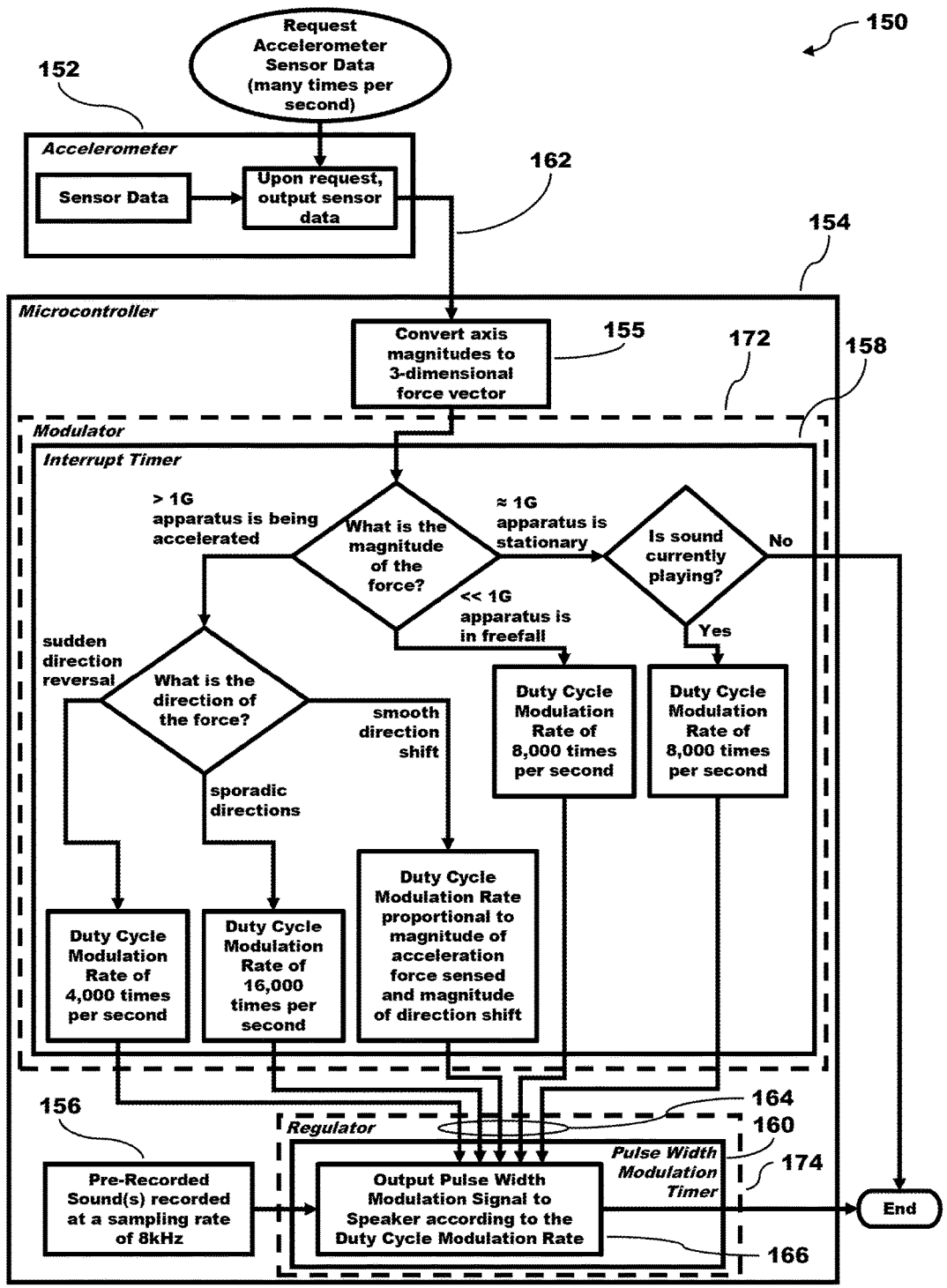

FIG. 21 is a flow chart of a process of the alternate embodiment of the variable sound generator of FIG. 9, which may be used to process the magnitude of acceleration of the variable sound generator; and FIG. 22 is a flow chart of another process of the alternate embodiment of the variable sound generator of FIG. 9, which may be used to process the magnitude of acceleration and direction of acceleration of the variable sound generator.

DESCRIPTION

The preferred embodiments of the present invention will be described with reference to FIGS. 1-22 of the drawings. Identical elements in the various figures are identified with the same reference numbers.

Figure 1:
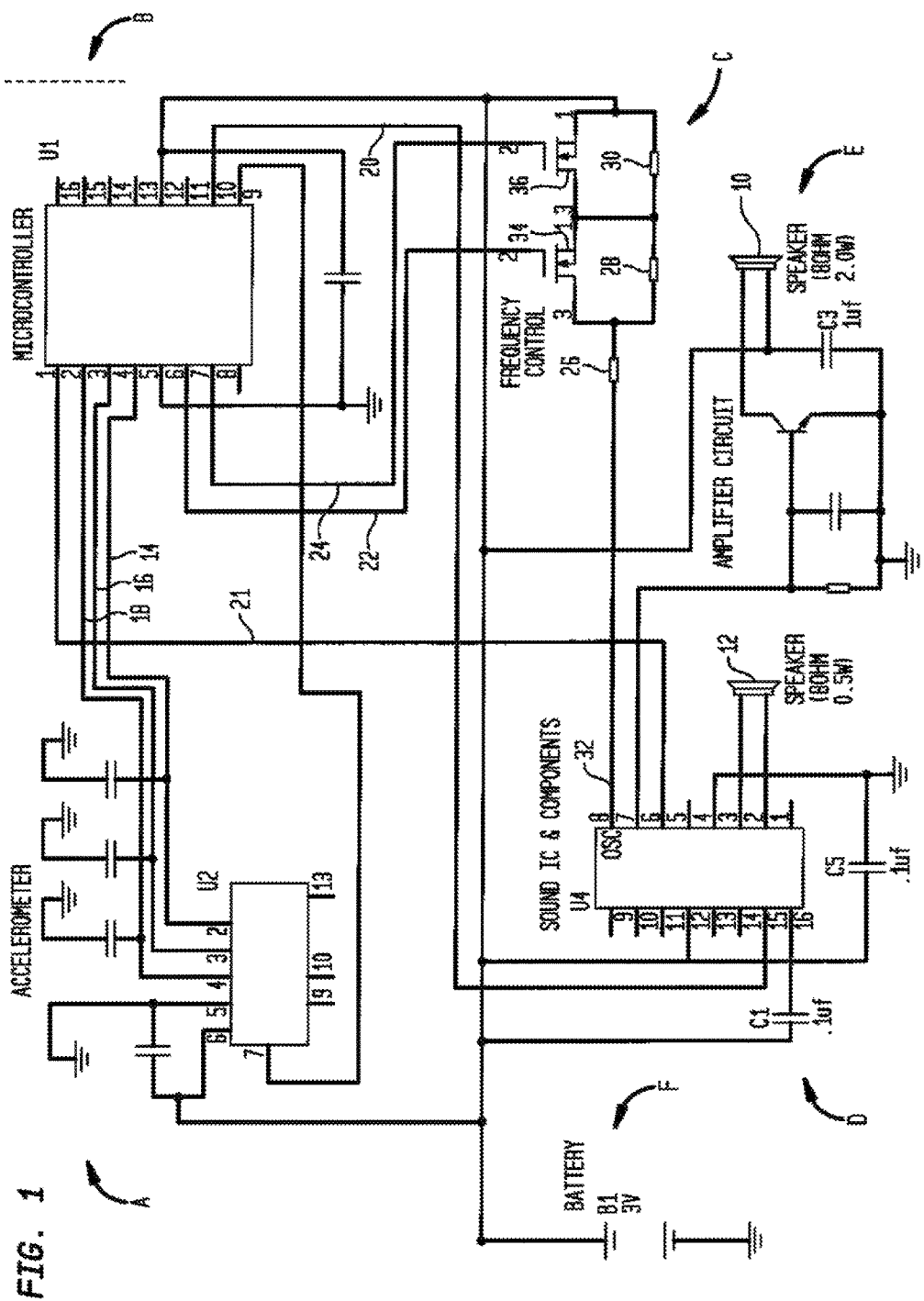
FIG. 1 is a circuit diagram of the components of a first preferred embodiment of the present invention.

As seen in FIG. 1, the device of the present invention includes an accelerometer, generally designed A, capable of providing three different output signals to a microcontroller, generally designated B. Microcontroller B is connected to a control circuit, generally designated C, which controls the speed at which a sound chip, generally designated D, processes a pre-recorded sound. Microcontroller B is also directly connected to the sound chip to activate the sound chip and monitor the output thereof. Sound chip D can either drive a speaker 10, which is part of an amplification circuit, generally designated E, or a speaker 12, connected directly to the output of the sound chip. All the components are powered by a battery, generally designated F.

Accelerometer A is preferably a three axis board mounted accelerometer capable of generating three separate output signals, one for each of the x, y and z directions, on lines 14, 16 and 18, respectively, indicating the magnitude and direction of the motion detected by the accelerometer. One commercially available component suitable for this application is Part No. MMA7361LCT, which is a 1.5G XYZ Low G analog accelerometer supplied by Freescale Semiconductor Inc. of Austin, Tex.

The output lines 14, 16 and 18 from accelerometer A are connected to three of the inputs of microcontroller B. Microcontroller B is connected to the sound chip by lines 20 and 21 such that it can turn the sound chip on or off and can monitor the output of the sound chip. It also provides signals to set the speed of operation of the sound chip, and hence the frequency of the sound signal generated by the sound chip, by selectively actuating transistors in control circuit C through output lines 22 and 24.

The microcontroller receives the three output signals from the accelerometer and determines if any one of the output signals has a magnitude above a pre-determined level, indicating motion detected above a threshold level in the direction associated with the line on which that output signal is present. It regulates the speed of the sound signal in accordance with the output signals from the accelerometer.

If an output signal indicating movement above the threshold level is detected on any of the output lines, an output is generated by the microcontroller on line 20 to sound chip D activating the sound chip D to generate a sound signal at a particular speed. If an output signal indicating motion above the threshold level is detected on at least two of the output lines, a high voltage output is generated by the microcontroller on line 22. If an output signal indicating motion above the threshold level is detected on all three output lines, a high voltage output is generated by the microcontroller simultaneously on both line 22 and line 24.

The microcontroller incorporates a timing circuit which includes a clock. The clock regulates the speed at which the microcontroller operates. The clock runs continuously but the timing circuit is activated once movement above the threshold level is detected in any direction and will cause the sound chip to continue to generate that sound signal for a time period determined by the length of the pre-recorded sound and for a short period thereafter, for example 2 seconds, after movement ceases, unless prior to timing out, movement in an additional direction is detected, in which case the speed of the sound chip will be reset and a pre-recorded sound will play at a different speed.

One commercially available microcontroller suitable for this application is Part No. HT46R064, which is an enhanced AID Type 8-bit OTP MCU supplied by Holtek Semiconductor (USA), Inc. of Fremont Calif.

Control circuit C includes three series connected resistors 26, 28 and 30, which may have different resistance values. The resistors are connected between the battery F and the oscillator input 32 of sound chip D.

The control signal from the control circuit is applied to the oscillator input of the sound chip and sets the speed that the chip processes a pre-recorded sound. The speed at which the sound chip processes the pre-recorded sound determines the character of the sound that is generated. In this case, the sound chip can operate at three different speeds and hence the device can generate sounds with three different characteristics.

When the sound chip is turned on by a signal on output line 20, but no output signals are present on microcontroller output lines 22 or 24, the combined resistance of resistors 26, 28 and 30 sets the oscillator of the sound chip to cause the sound chip to generate a pre-recorded sound, which under those circumstances, will be generated at a first speed. That occurs when motion in any single direction above the threshold level is detected.

Two bypass transistors 34 and 36 are also included in the control circuit. The gate of transistor 34 is connected to output line 22 of microcontroller B. The gate of transistor 36 is connected to output line 24 of microcontroller B. The output circuit of transistor 34 is connected in parallel with resistor 28. The output circuit of transistor 36 is connected in parallel with resistor 30.

When transistor 36 is turned on, resistor 28 is bypassed, and the overall resistance of the resistor circuit is reduced, thereby changing the setting of the oscillator and causing the sound chip to generate a sound signal at a second speed. When both transistor 36 and transistor 38 are turned on, resistor 28 and resistor 30 are both bypassed, and the overall resistance of the resistor circuit is further reduced, thereby changing the setting of the oscillator and causing a sound chip to generate a sound signal at a third speed.

The sound signal from sound chip D can be applied directly to drive a speaker 12. Alternatively, the sound signal can be connected to the input of an amplifier circuit E which includes speaker 10. The advantage of using the amplifier circuit E is that the sound generated by the sound chip may be louder and the amplitude of the sound signal may be either pre-set or varied as appropriate.

The sound chip also has an output line 21 which is connected to an input of microcontroller B. A signal from the sound chip on output line 21 indicates that the sound chip is generating a sound signal. Thus, the microcontroller can monitor the sound signal output of the sound chip such that it knows when a sound signal is being generated and when it is not.

It should be noted that the microcontroller activates the sound chip and the control circuit independently. Thus, if the sound chip is not operational and the device is simultaneously moved at a magnitude above the threshold level in two directions, the sound chip will generate the sound signal at the second speed, without first generating a sound signal at the first speed.

One commercially available sound chip suitable for use in this application is Part No. aP89010 Voice OTP IC, which is a low voltage CMOS 16-bit bus buffer supplied by Aplus Integrated Circuits Inc. of Taipei, Taiwan.

Figure 2:
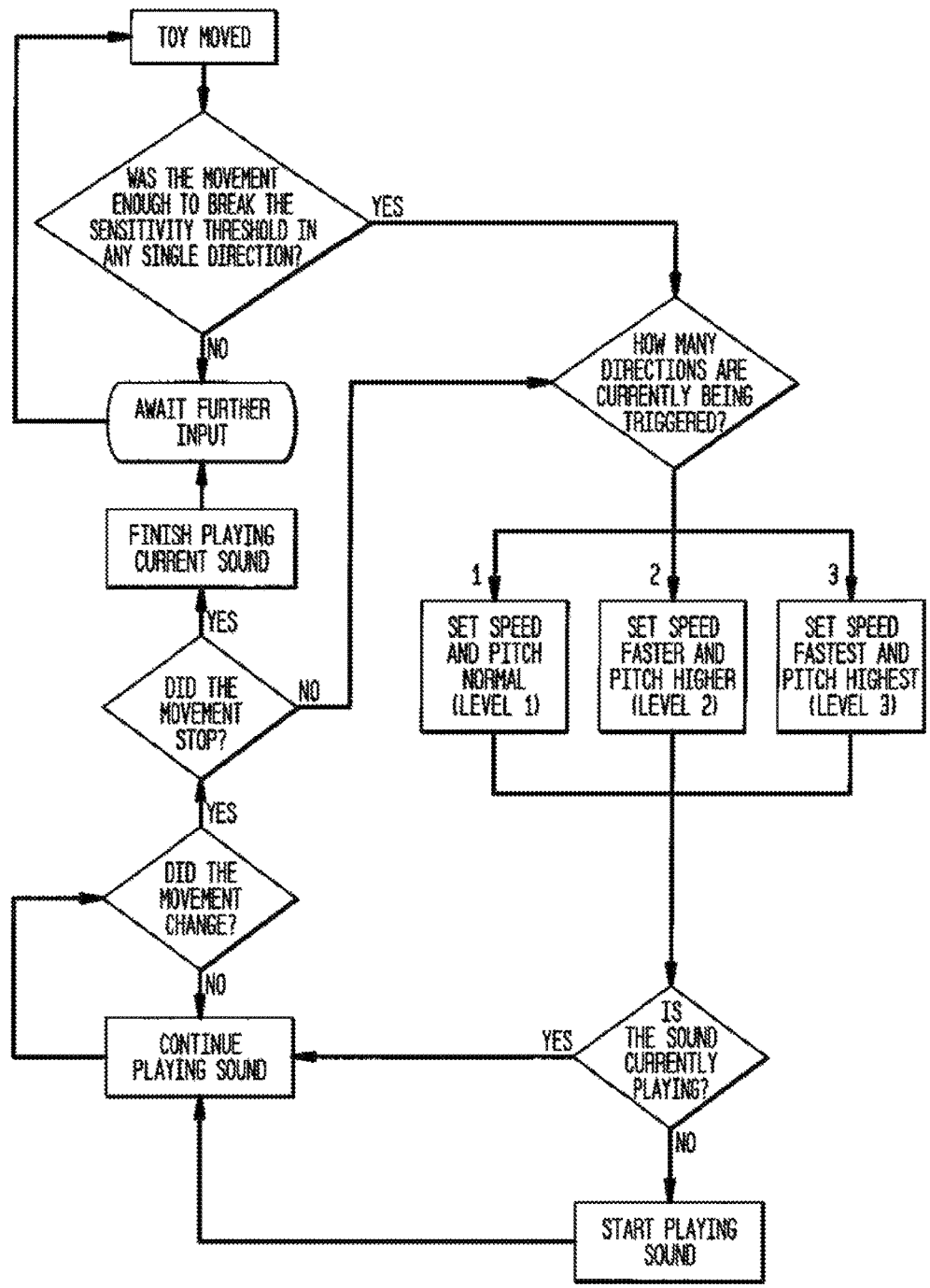
FIG. 2 is a flow chart of the operation of the first preferred embodiment of the present invention.

Reference is now made to FIG. 2 which is a flow chart illustrating the steps in the operation of the device of the present invention. When movement is detected in any direction, a determination is made as to whether the magnitude of the motion in any single direction is above a threshold level, indicating that the movement is of sufficient magnitude to cause the sound chip to generate a sound signal. If it is below the threshold, the device does nothing and awaits further input.

If, on the other hand, motion in any direction is detected to be above the threshold level, a determination is made as to how many different directions are currently above the threshold level (that is, being "triggered"). If only one direction is being triggered, the sound chip generates a sound signal at a first speed level (level 1). If two directions are being triggered, the sound chip generates a sound signal at a second speed level (level 2). If three directions are being triggered, the sound chip generates a sound signal at a third speed level (level 3).

The microcontroller monitors the output of the sound chip to determine if the sound signal is currently being generated. If it is not, the microcontroller will cause the sound chip to start generating the sound signal at the appropriate level. If the sound signal is currently being generated, the sound chip continues generating the sound signal.

The microcontroller then makes a determination as to whether there has been a change in the detected movement. If not, the sound chip continues to generate the sound signal. On the other hand, if movement has stopped, the sound chip will stop generating the sound signal and the device awaits further input indicating new movement.

Figure 3:
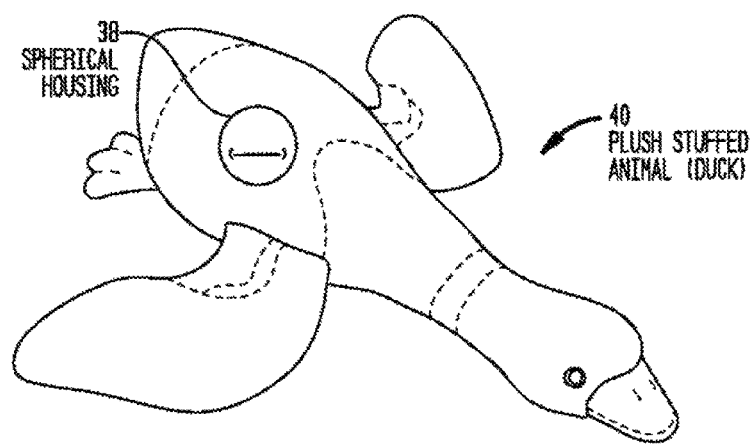
FIG. 3 is a drawing of a typical plush stuffed animal in the form of a duck within which the sound generator of the present invention is situated.

FIG. 3 illustrates a typical toy that the device of the present invention might be used in. The device may be situated in a spherical housing 38 made of plastic or rubber. Housing 38 may be situated in a plush stuffed animal, such as a duck 40. However, neither the particular shape of the housing nor the configuration or type of product in which the housing is situated should be considered to be a limitation on the present invention, as the sound generating device of the present invention could be used in a wide variety of different products in which it would be useful to have generated sounds with different characteristics.

It will now be appreciated that the present invention relates to a variable sound generating device suitable for use in a movement-activated product that makes sounds. The sounds are produced as a response to actual movement, rather than from externally applied pressure as in conventional squeeze toys. As the device is thrashed around and its movement changes in direction and/or intensity, the characteristics of the emitted sound also changes. As such, a toy having the present invention can keep the interest of a pet longer than a simple pressure-squeaker mechanism.

The sound generator creates sounds with three different characteristics, depending upon the magnitude and direction of the movement of the device. Sound at the appropriate speed level will be generated once movement of a magnitude above the threshold level is detected and the sound will continue to be generated for a pre-set time period after movement has stopped.

The accelerometer and the sound chip are connected to the microcontroller. A series of three resistors are attached to the oscillator input of the sound chip, which is typically used to set the sound chip clock speed to match the rate at which the sound or sounds were recorded. Two of those resistors are connected with "bypass" MOSFETs to allow for different sound activity.

The microcontroller repeatedly polls the accelerometer to see if the device is being moved. If it is, and the movement is above the sensitivity threshold, the microcontroller causes the sound chip to start generating the sound. While it is doing that, the microcontroller also takes note of how many axes are being moved at a magnitude exceeding the sensitivity threshold.

If one axis is being triggered, then nothing regarding speed of the sound signal needs to be set and the combined resistance of all three resistors sets the processing speed of the sound chip. If two axes are being triggered at the same time, the microcontroller sends a high voltage signal to one logic-level MOSFET that bypasses one of the resistors attached to the oscillator of the sound chip. That causes the sound chip to operate faster, causing the sound chip to generate a pre-recoded sound at a higher speed—it essentially acts as if the pre-recorded sound is supposed to be generated at a faster bitrate. If all three axes are being triggered simultaneously, the microcontroller sends a high voltage signal to both logic-level MOSFETs, causing two of the resistors attached to the oscillator of the sound chip to be bypassed, and the speed of the sound signal to be further increased. The default mode of operation for the MOSFETs is normally off when the microcontroller provides a low voltage signal to the gates of the transistors.

Figure 4:
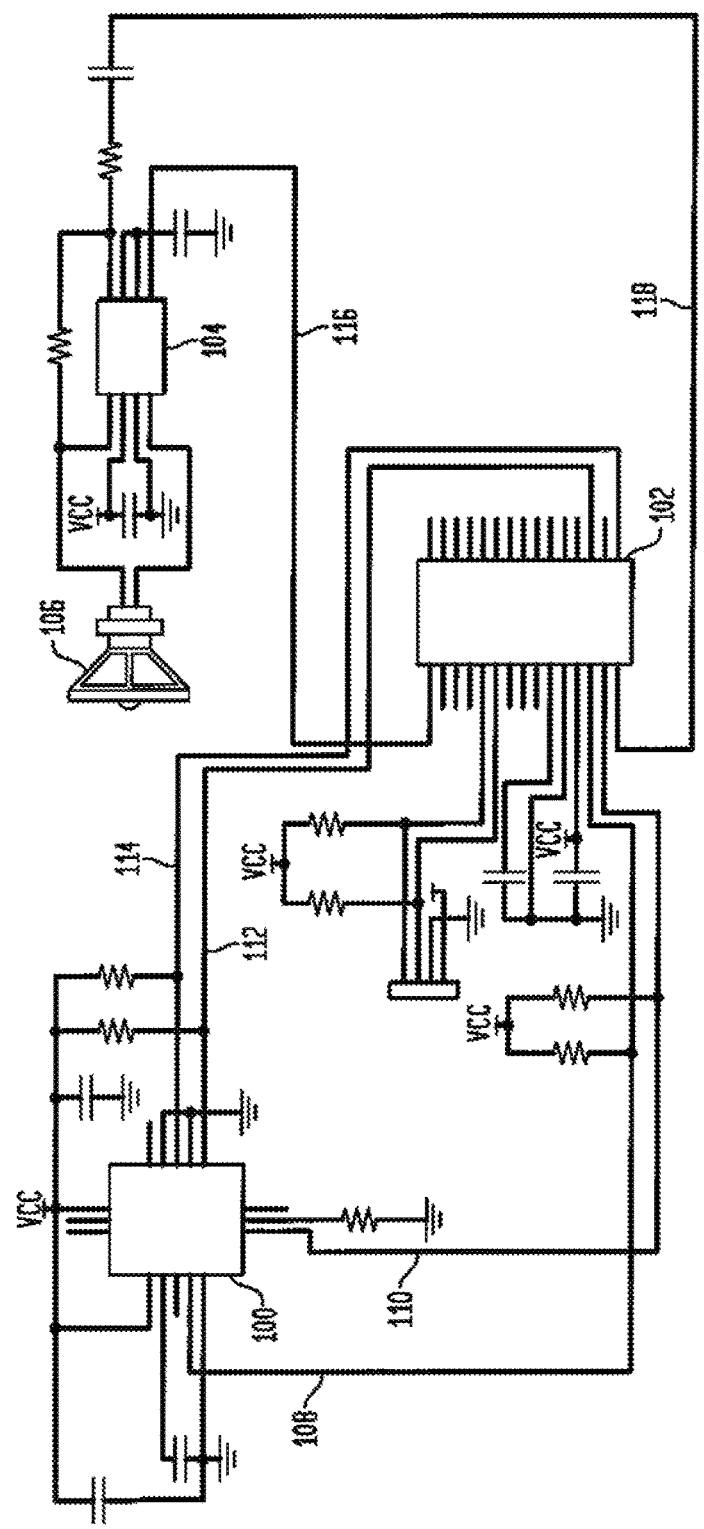
FIG. 4 is a circuit diagram of the components of a second preferred embodiment of the present invention.

FIGS. 4-8 relate to the software based second preferred embodiment of the present invention. FIG. 4 is a block diagram of the components of the second preferred embodiment of the device. This embodiment includes a movement parameter sensor, such as an accelerometer, capable of sensing the direction and/or magnitude (force) of movement in one or more directions. The sensor provides the input to a microprocessor. The microprocessor controls the characteristics (speed and pitch) of a pre-recorded sound, which is played by the device through an amplification circuit and a speaker, in accordance with the sensed motion.

As depicted in FIG. 4, the second preferred embodiment of the device includes: a sensor capable of detecting a parameter of movement, such as the direction and/or magnitude (force) of movement to which the device is subjected, which in this embodiment takes the form of an accelerometer 100. A microcontroller 102 is connected to receive the output of accelerometer 100. An amplification circuit 104 is connected to receive the output from microcontroller 102 and to drive a speaker 106 in accordance with the output of microcontroller 102.

Accelerometer 100 may take the form of an Xtrinsic 3-axis 10-bit Digital capacitive macromachined accelerometer. The accelerometer has flexible user-programmable options which can be configured to generate inertial wake-up interrupt signals and to monitor events. It has three embedded channels which permit free fall or motion detection, pulse detection, and jolt detection. This component has a low power mode and is configurable for auto-wake and sleep (rest) functions. Such an accelerometer is available from Freescale Semiconductor Inc. of 6501 William Cannon Drive West Austin, Tex. 78735.

The SCK output 108 and the SDA output 110 of accelerometer 100 are connected to the data inputs of microcontroller 102. The microcontroller may take the form of Part No. R5F100ACASP which is available from Renesas Electronics America Inc. of 2880 Scott Boulevard, Santa Clara, Calif. 95050. That microcontroller includes a 16 bit CPU with a maximum frequency of 32 MHz. The INTP2 output 112 from the accelerometer is connected to the INTP2 input pin of the microcontroller. The INTP3 output 114 from the accelerometer is connected to the INTP3 input pin of the microcontroller.

The audio standby output 116 of microcontroller 102 is connected to the standby input of amplifier 104. The audio pulse width modulation output 118 of microcontroller 102 is connected to the voltage input of amplified 104.

The amplifier may take the form of Part No. TS487 available from STMicroelectronics of Geneva, Switzerland. It is a dual audio power amplifier capable of driving, in single-ended mode, either a 16 or a 32 W stereo headset. An externally-controlled standby mode reduces the supply current to 10 nA (typ.). The unity gain stable circuit can be configured by external gain-setting resistors or used in a fixed gain version.

The output of amplifier circuit 104 can drive a headset or, as shown, an audio speaker 106.

Figure 5:
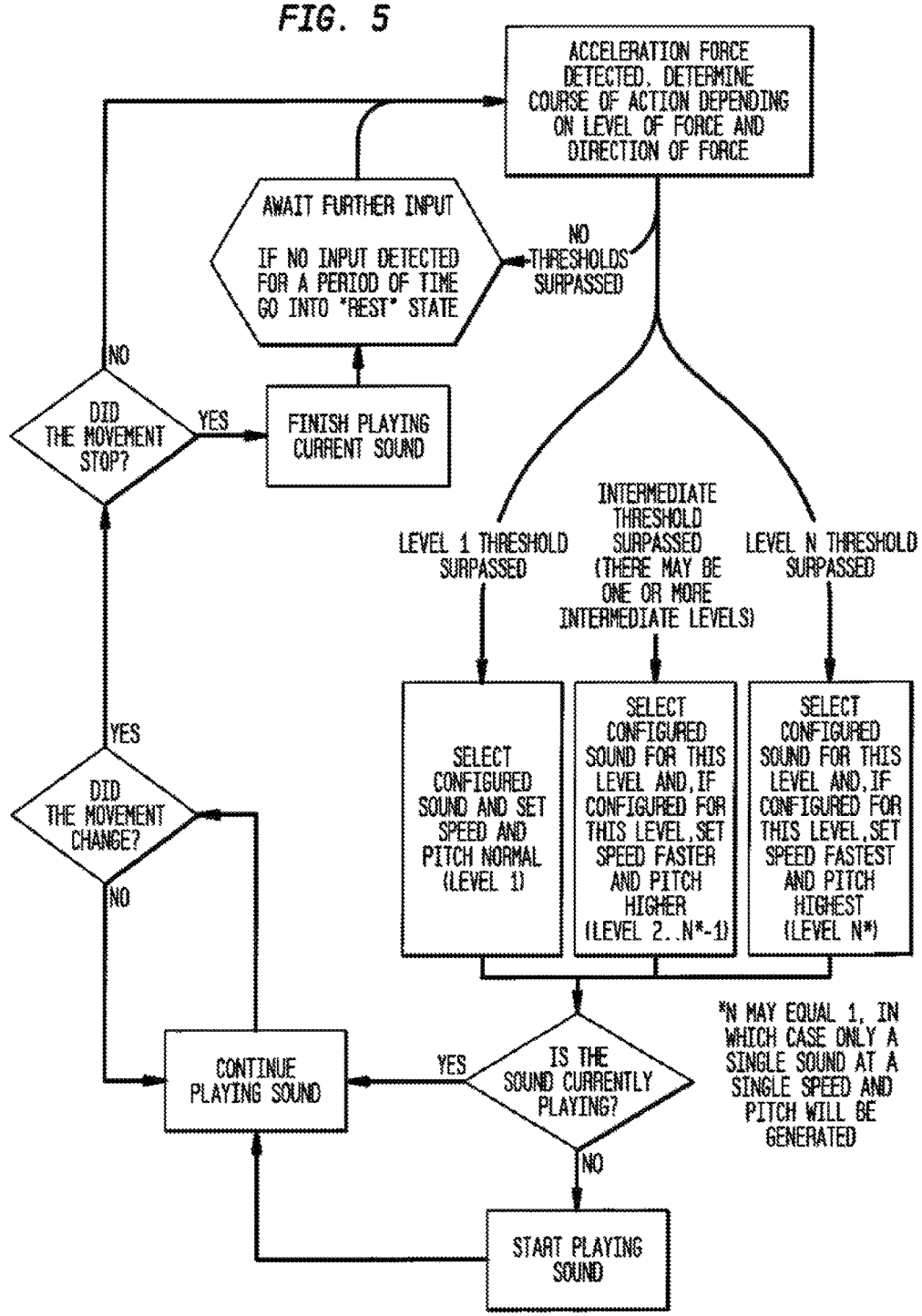
FIG. 5 is a flow chart of the function of the second preferred embodiment of the present invention.

FIG. 5 is a flow chart illustrating the function of the electronic components which create the desired sounds in response to movement of the device. In this second preferred embodiment, the control over the characteristics of the sound generated by the device is software based, in contrast to the first preferred embodiment wherein that function is controlled by hardwired circuits. However, all perceived functionality, in terms of how the user of such a device would interact with the device, are the same in both embodiments.

In the first embodiment, a separate pre-programmed sound playback integrated circuit D ("Sound IC") is controlled by the pre-programmed microcontroller. The microcontroller uses an algorithm to determine when to trigger sound playback and controls a mechanism by which the "speed" (both pitch and frequency) of a pre-recorded "sound" (not tone generation) is determined.

In the second preferred embodiment, as illustrated in FIG. 4, the "Sound IC" functionality, as well as the "speed" control mechanism, is incorporated into the software of microcontroller 102.

As illustrated by the flow chart of FIG. 5, which illustrates the function of the software, when the device is moved (acceleration force is sensed), a determination is made by the microcontroller as to whether the movement sensed exceeds any one of a number of predetermined playback thresholds or whether the device is in free fall. If the aforementioned thresholds are exceeded, or if the device is in free fall, the playback "speed" of the "sound" is determined. Simultaneously, the particular "sound" to be played is selected.

As an example, a particular direction of movement may determine which, of many, pre-recorded sounds to play and the magnitude of movement may determine the speed at which to play the selected sound. Any combination of force magnitudes and/or directions may be configured.

The exemplary device uses three levels of "speed" based on the magnitude of acceleration force being sensed. One method by which the speed may be calculated can be simply to control the speed and pitch of playback sound to be proportional to the amount of acceleration force sensed. More or fewer than three sound levels may be employed; any reference to three speed levels is used for illustrative purposes.

If the "sound" is not currently playing and a "speed" has been set, the "sound" will begin playing at that speed. If the "sound" is already playing, the "speed" will be set on-the-fly (during "sound" playback), changing the "speed" of the "sound" as it continues to play. Additionally, the particular sound being modified can also change so that the "speed" is applied to a different pre-recorded sound.

Any time changes in acceleration force are sensed, the "speed" will be changed accordingly until no threshold-exceeding acceleration forces are sensed (AND the device is not in free fall). This is considered a "rest" state. Upon entering "rest" for a predetermined time period, the sound will stop.

Assuming the device starts in the "rest" state, when acceleration is detected by the accelerometer, a determination is made as to the course of action depending upon the level of forced sensed. If the device is in free fall or a threshold is surpassed, the speed and pitch of the generated sound is set at a corresponding level and a particular sound is selected for playback. As different combinations of force magnitude and/or direction thresholds are surpassed, the speed of the generated sound is set faster or slower and the pitch of the generated sound is set higher or lower depending upon the configuration.

Once the level of the generated sound is set, the microcontroller determines if the sound is already being generated. If it is not, the microcontroller causes the sound generating circuit to start playing the selected sound at the speed and sound level previously determined. If the sound generator is already playing, the microcontroller causes the sound generating circuit to continue the play the sound until a change in the movement is sensed. If the movement has stopped, the sound generating circuit will finish playing the current sound and, if no movement exceeding any of the playback thresholds is detected for a pre-set period of time, the microcontroller will enter the "rest" or "sleep" state. On the other hand, if movement above one of the playback thresholds has not stopped, the software will cycle back to the beginning, evaluate the force detected and determine the appropriate sound and the level of that sound to be generated.

Figure 6:
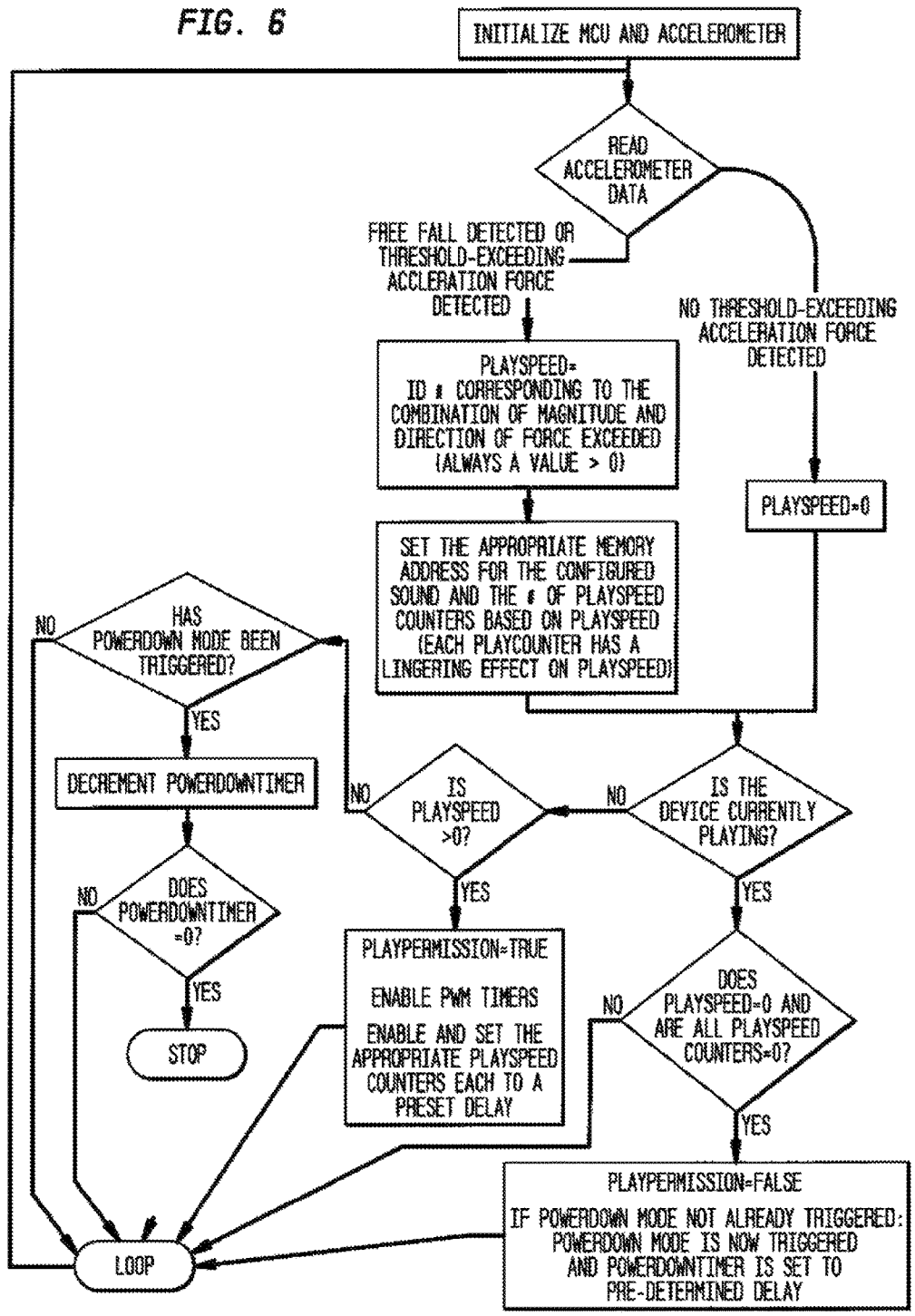
FIG. 6 is a high level flow chart of the software of the second preferred embodiment of the present invention.
Figure 7:
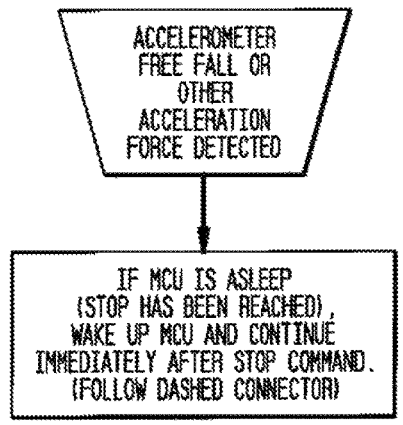
FIG. 7 is a flow chart of the software relating to the external interrupts of the second preferred embodiment of the present invention.
Figure 8:
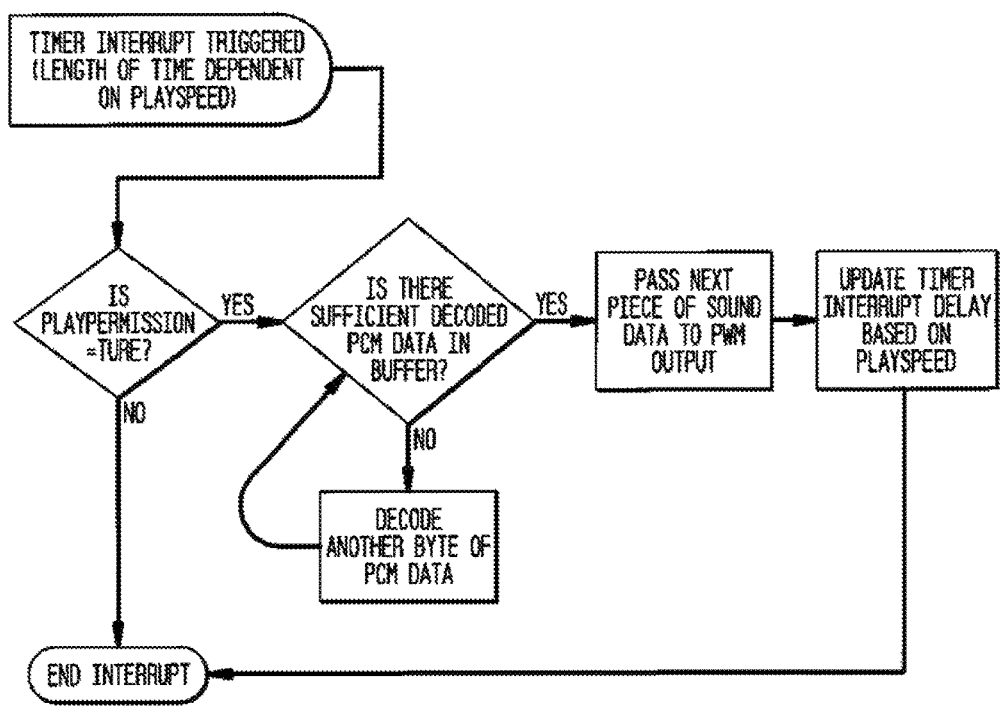
FIG. 8 is a flow chart of the software relating to the internal interrupts of the second preferred embodiment of the present invention.

FIGS. 6-8 are flowcharts illustrating the software procedure. Three separate portions of the software are illustrated. The primary logic portion of the software is illustrated in FIG. 6. FIG. 7 shows the portion of the software which relates to external interrupts sent from the accelerometer under certain conditions. FIG. 8 shows the portion of the software which relates to internal interrupts based on time intervals used for "sound" playback.

As seen in FIG. 6, upon receiving power, the accelerometer 100 and the microcontroller 102 are initialized. A read command is sent to the accelerometer to assess the current levels of acceleration forces being sensed along all three axes.

There are two paths to follow at this point, depending on the acceleration force sensed. If the device is detected to be in free fall, the PlaySpeed is set accordingly and Axis Counters are set accordingly (or disabled as the configuration may be). Additionally, the sound is also selected according to the configuration at this stage.

If the PlaySpeed Counters are enabled for the sensed threshold-level, those counters are set to a pre-determined number of cycles. The PlaySpeed Counters allow the forces sensed to have an impact on the "speed" of the "sound" after the force is no longer sensed to produce a smoother effect on the changing "speeds". If no threshold-exceeding forces detected, the PlaySpeed is set to 0. Next, the microcontroller determines whether the sound generator is currently playing the pre-recorded "sound" and follows a course of action depending on several states.

If the device is playing sound, AND the PlaySpeed is 0, AND all PlaySpeed Counters are equal to 0, the device revokes the permission to continue playing the sound (PlayPermission=False). The device is programmed to finish playing the current "sound" and will not begin playing it again unless PlayPermission is given (PlayPermission=True). The device then enters a Power-Down mode and sets a PowerDown Timer to a pre-determined number of cycles. After that, the program loops back and reads the accelerometer output again.

If the device is playing sound, AND either the PlaySpeed is NOT 0, OR there is at least one PlaySpeed Counter that is greater than 0, all PlaySpeed Counters are decremented by 1 cycle and the program loops back to read the accelerometer output again.

If the device is NOT playing sound, AND the PlaySpeed is greater than 0, permission to play the sound is granted (PlayPermission=True), the PWM timers (software interrupt timers) are enabled and set appropriately using PlaySpeed, and the PlaySpeed Counters corresponding to the force sensed are set to a pre-determined number of cycles, and the corresponding sound is selected for playback. The program then loops back to check the accelerometer output.

If the device is NOT playing sound, AND the PlaySpeed is equal to 0, then if the device has entered PowerDown mode, the PowerDown Timer is decremented. If at this point, the PowerDown Timer is equal to 0, the device enters a "rest" state ("STOP"). Upon awakening from sleep (as a result of an external interrupt), the program will continue from the read the accelerometer step. If the PowerDown Timer is still greater than 0 at this point, the program loops back to read the accelerometer output step.

FIG. 7 illustrates the external interrupts portion of the software. External interrupts are currently set up to listen for force detection or awake/sleep mode changes from the accelerometer. However, this is a function of the specific technology and the specific devices being used in this exemplary embodiment to facilitate power-conservation techniques.

FIG. 8 illustrates the internal interrupts portion of the software. There are two internal interrupts that are used to actually output the sound and control the other aspects of sound encoding/decoding. The "speed" control internal interrupts are illustrated in this figure. Upon the interrupt being thrown, the software determines whether it has permission to play the "sound". If permission has NOT been granted (PlayPermission=False), the interrupt is terminated.

If permission has been granted (PlayPennission=True), the software determines whether there is sufficient "sound" data decoded for output. If there is NOT enough data in the buffer, the software decodes enough of the data to prevent a buffer under-run. Once enough "sound" data is decoded in the buffer, the next piece of "sound" data is passed to PWM output and the sound is produced at the speaker. The interrupt timer is then updated based on the current PlaySpeed setting and the interrupt is terminated.

It will now be appreciated that the present invention can be implemented with hardwired sound generating and frequency control components, such as in the first preferred embodiment disclosed herein, or in a software version such as in the second preferred embodiment disclosed herein. In either version, a movement parameter sensing component such as an accelerometer is used to monitor device movement and a microcontroller is used to regulate the speed and pitch of a pre-recorded sound which is played in response to device movement exceeding a pre-determined threshold. Also, in either version, the characteristics of the sound emitted may be changed on the fly providing those sounds exist in memory.

The device of either preferred embodiment of the invention is well suited for use in a toy, such as a pet toy. However, the device may have many other applications, and the invention should not be considered to be limited to such use.

FIGS. 9-22 show an alternate embodiment of a variable sound generator 150 of the present invention, constructed in accordance with the present invention.

Figure 10:
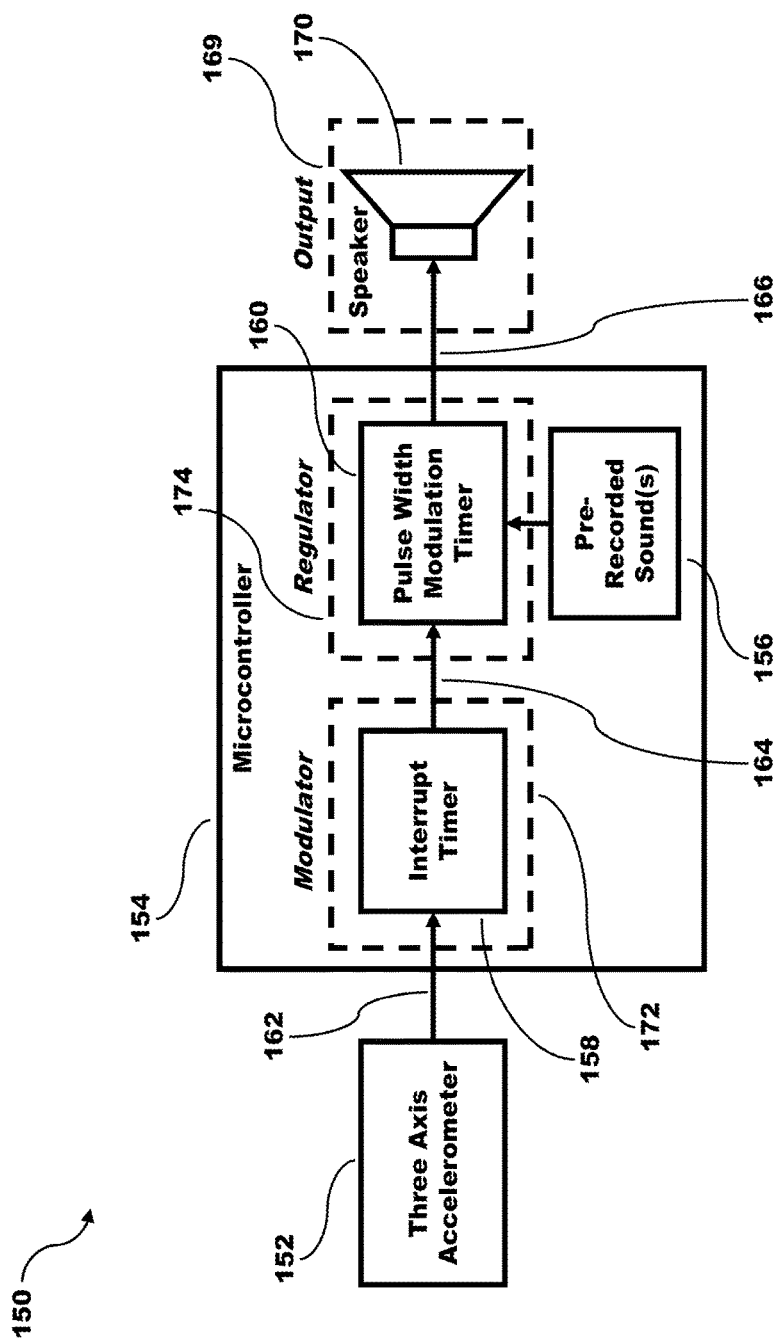
FIG. 10 is a more detailed block diagram of the alternate embodiment of the variable sound generator of FIG. 9.
Figure 11:
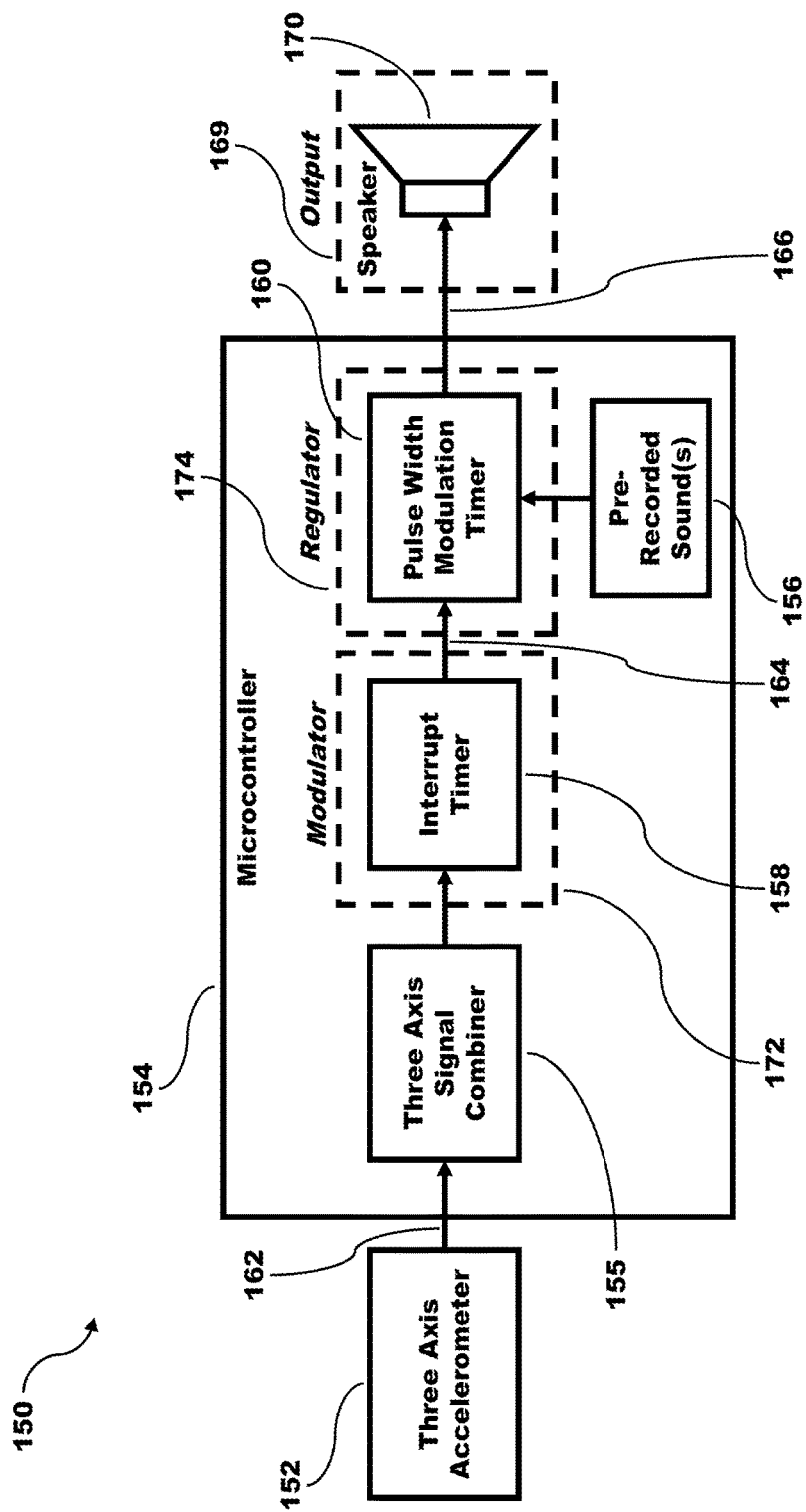
FIG. 11 is another more detailed block diagram of the alternate embodiment of the variable sound generator of FIG. 9.

FIGS. 9-11 show block diagrams of the variable sound generator 150 of the present invention in progressively more detail.

Figure 12:
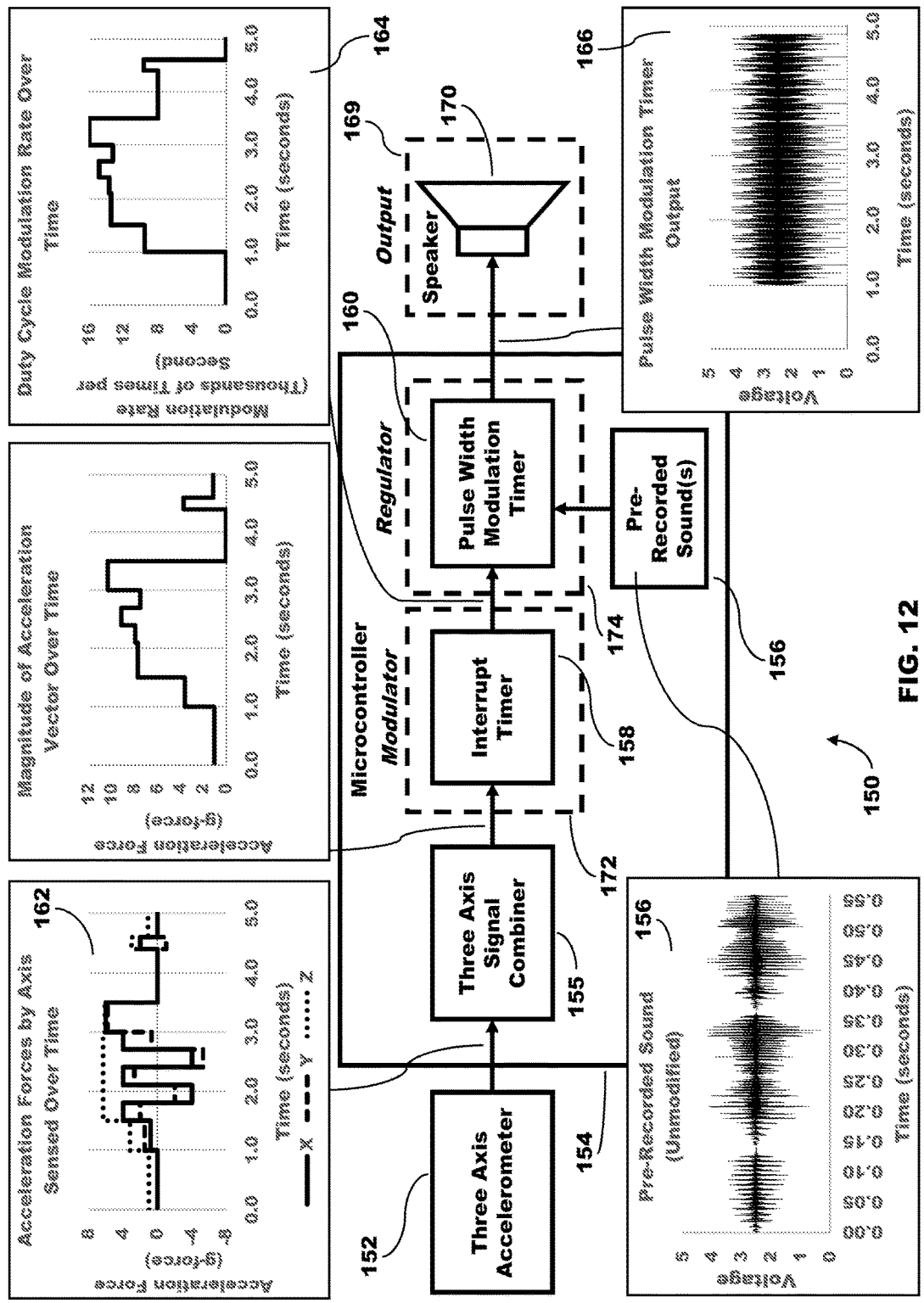
FIG. 12 is a block diagram of the alternate embodiment of the variable sound generator of FIG. 9 showing signal inputs and signal outputs at different portions of the alternate embodiment of the variable sound generator.

FIG. 12 shows a block diagram of the alternate embodiment of the variable sound generator 150 showing signal inputs and signal outputs at different portions of the alternate embodiment of the variable sound generator 150, which are described in more detail below. FIG. 12 also shows acceleration forces sensed over time and magnitude of the acceleration vector sensed over time.

Figure 13:
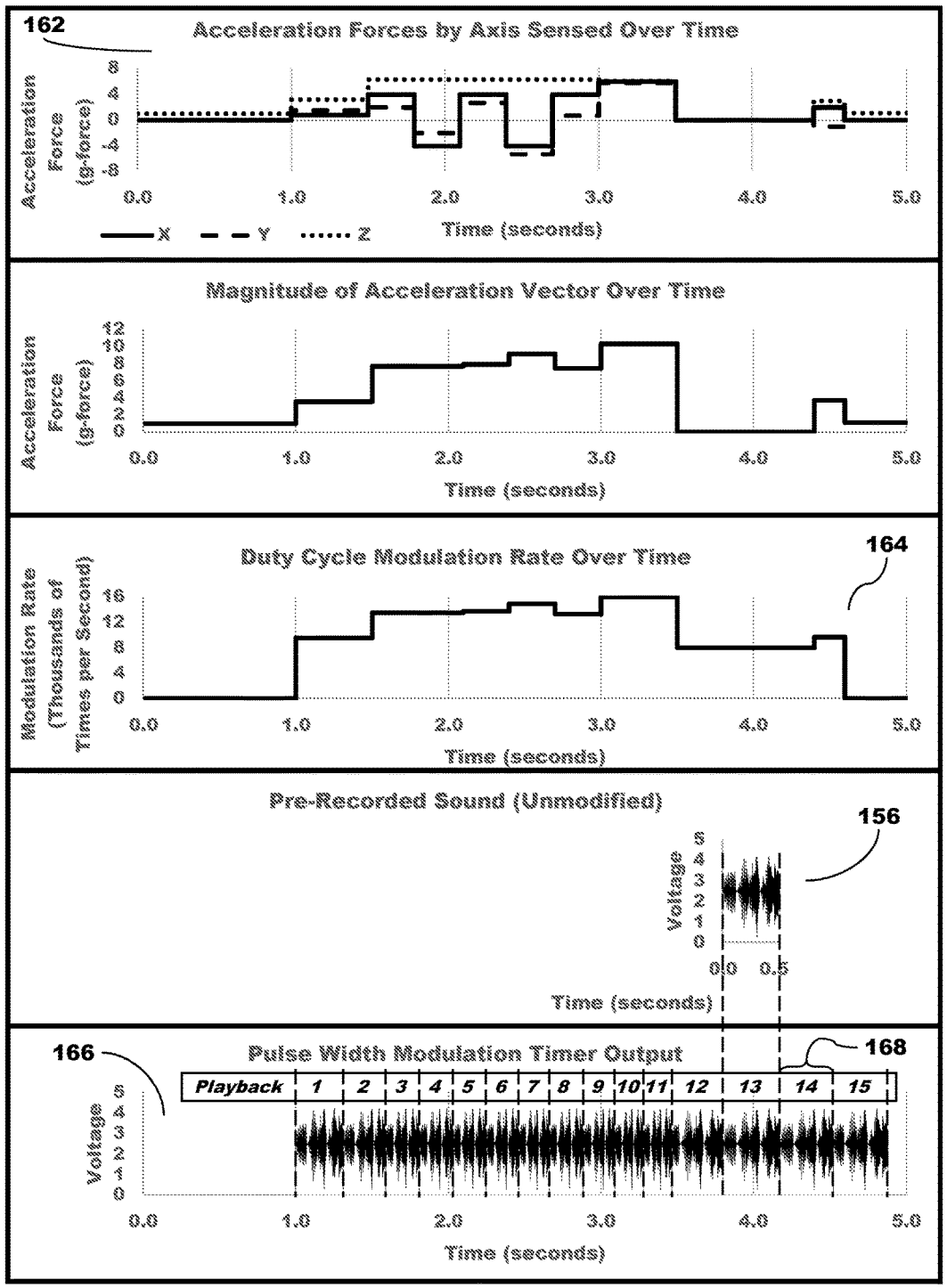
FIG. 13 is an enlarged schematic representation showing the signal inputs and signal outputs at different portions of the alternate embodiment of the variable sound generator.

FIG. 13 shows an enlarged schematic representation of the signal inputs and signal outputs at different portions of the alternate embodiment of the variable sound generator 150, which are shown in FIG. 12 and described in more detail below.

The variable sound generator 150 is a three axis acceleration sensitive sound producing apparatus, comprising a three axis accelerometer 152 and a microcontroller 154, as shown in FIGS. 9-11. The microcontroller 154 comprises at least one stored sound 156, an interrupt timer 158, and a pulse width modulation timer 160. The microcontroller 154 of the variable sound generator 150 processes signals received from the three axis accelerometer 152, based upon motion of the variable sound generator 150 that is sensed by the three axis accelerometer 152.

The three axis accelerometer 152 senses motion of the variable sound generator 150, and measures acceleration associated with the sensed motion in each direction of three directions. The three axis accelerometer 152 generates accelerometer output signals 162, comprising acceleration information, which comprises magnitude of acceleration and direction information associated with the measured sensed motion of the three axis accelerometer 152 in each direction of the three directions. The three axis accelerometer 152 communicates the generated accelerometer output signals 162 to the microcontroller 154.

The microcontroller 154 receives and processes the communicated accelerometer output signals 162 into a pulse width modulation timer input signal 164, according to the magnitude of acceleration and direction of acceleration information in the accelerometer output signals 162 received from the three axis accelerometer 152.

The interrupt timer 158 modulates the pulse width modulation timer 160 according to the pulse width modulation timer input signal 164, and the pulse width modulation timer 160 generates a pulse width modulation timer output signal 166.

The microcontroller 154 determines, according to instructions provided to the microcontroller 154, whether to:
increase, by the pulse width modulation timer 160, playback speed 168 when the magnitude of acceleration increases and
decrease, by the pulse width modulation timer 160, the playback speed 168 when the magnitude of acceleration decreases; and/or increase, by the pulse width modulation timer, the playback speed 168 when change in the direction of acceleration increases and
decrease, by the pulse width modulation timer 160, the playback speed 168 when the change in the direction of acceleration decreases.

An increase of the playback speed 168 of the at least one stored sound 156 results in an increase in perceived pitch, and a decrease of the playback speed 168 of the at least one stored sound 156 results in a decrease in perceived pitch.

The pulse width modulation timer 160 regulates the playback speed 168 of the at least one stored sound 156 according to the pulse width modulation timer input signal 164, which comprises:
varying the playback speed 168, by the pulse width modulation timer 160, according to the magnitude of acceleration and/or the direction of acceleration, comprising:
increasing, by the pulse width modulation timer 160, the playback speed 168 when the magnitude of acceleration increases and
decreasing, by the pulse width modulation timer 160, the playback speed 168 when the magnitude of acceleration decreases; and/or
increasing, by the pulse width modulation timer, the playback speed when change in the direction of acceleration increases and
decreasing, by the pulse width modulation timer 160, the playback speed when the change in the direction of acceleration decreases.

In more detail, the pulse width modulation timer 160 may be used to regulate the playback speed 168 of the at least one stored sound 156 according to the pulse width modulation timer input signal 164, comprising:
varying the playback speed 168, by the pulse width modulation timer 160, according to the magnitude of acceleration, comprising:
increasing, by the pulse width modulation timer 160, the playback speed 168 when the magnitude of acceleration increases and
decreasing, by the pulse width modulation timer 160, the playback speed 168 when the magnitude of acceleration decreases.

Alternatively, in more detail, the pulse width modulation timer 160 may be used to regulate the playback speed 168 of the at least one stored sound 156 according to the pulse width modulation timer input signal 164, comprising:
varying the playback speed 168, by the pulse width modulation timer 160, according to the direction of acceleration, comprising:
increasing, by the pulse width modulation timer 160, the playback speed 168 when change in the direction of acceleration increases and
decreasing, by the pulse width modulation timer 160, the playback speed 168 when the change in the direction of acceleration decreases.

Alternatively, in more detail, the pulse width modulation timer 160 may be used to regulate the playback speed 168 of the at least one stored sound 156 according to the pulse width modulation timer input signal 164, comprising:
varying the playback speed 168, by the pulse width modulation timer 160, according to the magnitude of acceleration and the direction of acceleration, comprising:
increasing, by the pulse width modulation timer 160, the playback speed 168 when the magnitude of acceleration increases and decreasing, by the pulse width modulation timer 160, the playback speed 168 when the magnitude of acceleration decreases; and increasing, by the pulse width modulation timer 160, the playback speed 168 when change in the direction of acceleration increases and decreasing, by the pulse width modulation timer 160, the playback speed 168 when the change in the direction of acceleration decreases.

The microcontroller 154 plays back the at least one stored sound 156, according to the regulated playback speed 168, to output 169 comprising loudspeaker 170.

The interrupt timer 158 modulates the duty cycle modulation rate, i.e., the modulation rate of the duty cycle of the pulse width modulation timer 160, which regulates the playback speed of the at least one stored sound 156. The pulse width modulation timer 160, thus, regulates the playback speed of the at least one stored sound 156, based upon the duty cycle modulation rate, i.e., the modulation rate of the duty cycle of the pulse width modulation timer 160.

The variable sound generator 150 of the present invention shown in FIGS. 9-22 comprises the three axis accelerometer 152, which senses motion, measures acceleration associated with the sensed motion in each direction of three directions, and generates accelerometer output signals 162, comprising acceleration information, which comprises magnitude of acceleration and direction information associated with the measured sensed motion of the three axis accelerometer 152 in each direction of the three directions. The three axis accelerometer 152 communicates the generated accelerometer output signals 162 to the microcontroller 154.

The three axis accelerometer 152 senses g-force. g-force on an object is its acceleration relative to free-fall. The object experiences this acceleration due to the vector sum of non-gravitational forces acting per unit of the object's mass. This acceleration, also known as "proper acceleration," is not the result of gravity itself. The g-force causes an accelerating object to experience a force acting in the opposite direction which the object to the acceleration.

Although this acceleration, known as "proper acceleration," is not the result of gravity itself, it is expressed with the units of g-force or g. Proper acceleration is the acceleration force considered to be experienced relative to freefall. The g-force acting on an object in any weightless environment, such as free-fall in a vacuum, is 0 g. 1 g is equal to the force of gravity at the Earth's surface, which is 9.8 meters per second per second. The g-force on an object is its acceleration relative to free-fall. Again, the object experiences this acceleration due to the vector sum of non-gravitational forces acting per unit of the object's mass.

FIG. 14 shows a schematic representation in tabular form of typical acceleration forces, magnitude of acceleration force vectors, and duty cycle modulation rates for typical forces acting on the variable sound generator 150, which are shown at different time frames in FIGS. 12 and 13.

Proper acceleration can be measured using a mass on a spring or cantilever beam or by other techniques. When an apparatus experiences a change in proper acceleration, the mass is displaced which stresses the spring or cantilever beam.

Modern day accelerometers typically use more sophisticated ways of measuring acceleration. Some accelerometers sense acceleration using a piezoelectric effect, and others sense acceleration by sensing changes in capacitance. Mechanical motion sensed by accelerometers is typically converted to voltage, resistance, or capacitance signals for use in electronic circuits.

The three axis accelerometer 152 of the present invention may use three accelerometers, each of which are arranged orthogonal to one another along cartesian coordinate axes, which generate proper acceleration along each of the three cartesian coordinate axes into one or more accelerometer output signals 162, based upon the acceleration that is sensed by the three axis accelerometer 152, although other suitable accelerometers may be used.

Analog accelerometers, which generate the accelerometer output signals 162 directly, or digital accelerometers which convert the analog signals into digital signals before transmitting the signals via a digital communication protocol may be used.

The three axis accelerometer 152 may be a three axis analog accelerometer, such as an Analog Devices ADXL335 or other suitable three axis analog accelerometer. Alternatively, the three axis accelerometer 152 may be a three axis digital accelerometer, such as a Freescale MMA8453QT or other suitable three axis digital accelerometer.

FIG. 15 shows another more detailed block diagram of the variable sound generator 150, showing typical components that may be found in a suitable microcontroller 154 and which may be used to construct the present invention.

The microcontroller 154 may be a Renesas R5F100ACASP microcontroller or other suitable microcontroller.

Figure 16:
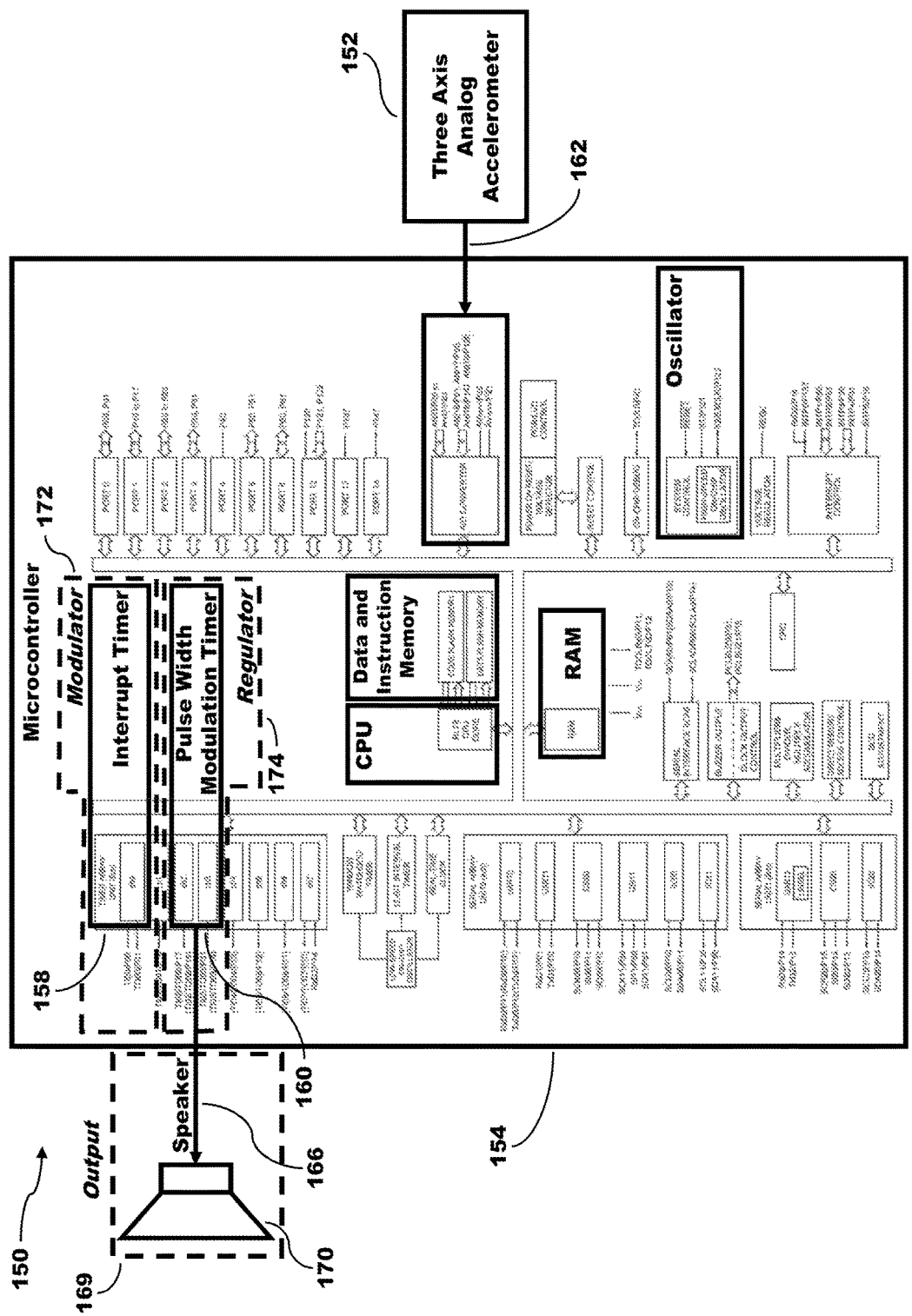
FIG. 16 is another more detailed block diagram of the alternate embodiment of the variable sound generator of FIG. 9, using a three axis analog accelerometer input to a typical microcontroller to construct the variable sound generator, showing the microcontroller in more detail.

FIG. 16 shows another more detailed block diagram of the variable sound generator 150, using a three axis analog accelerometer input to a typical microcontroller, such as the Renesas R5F100ACASP microcontroller or other suitable microcontroller to construct the variable sound generator 150, showing the microcontroller in more detail.

Figure 17:
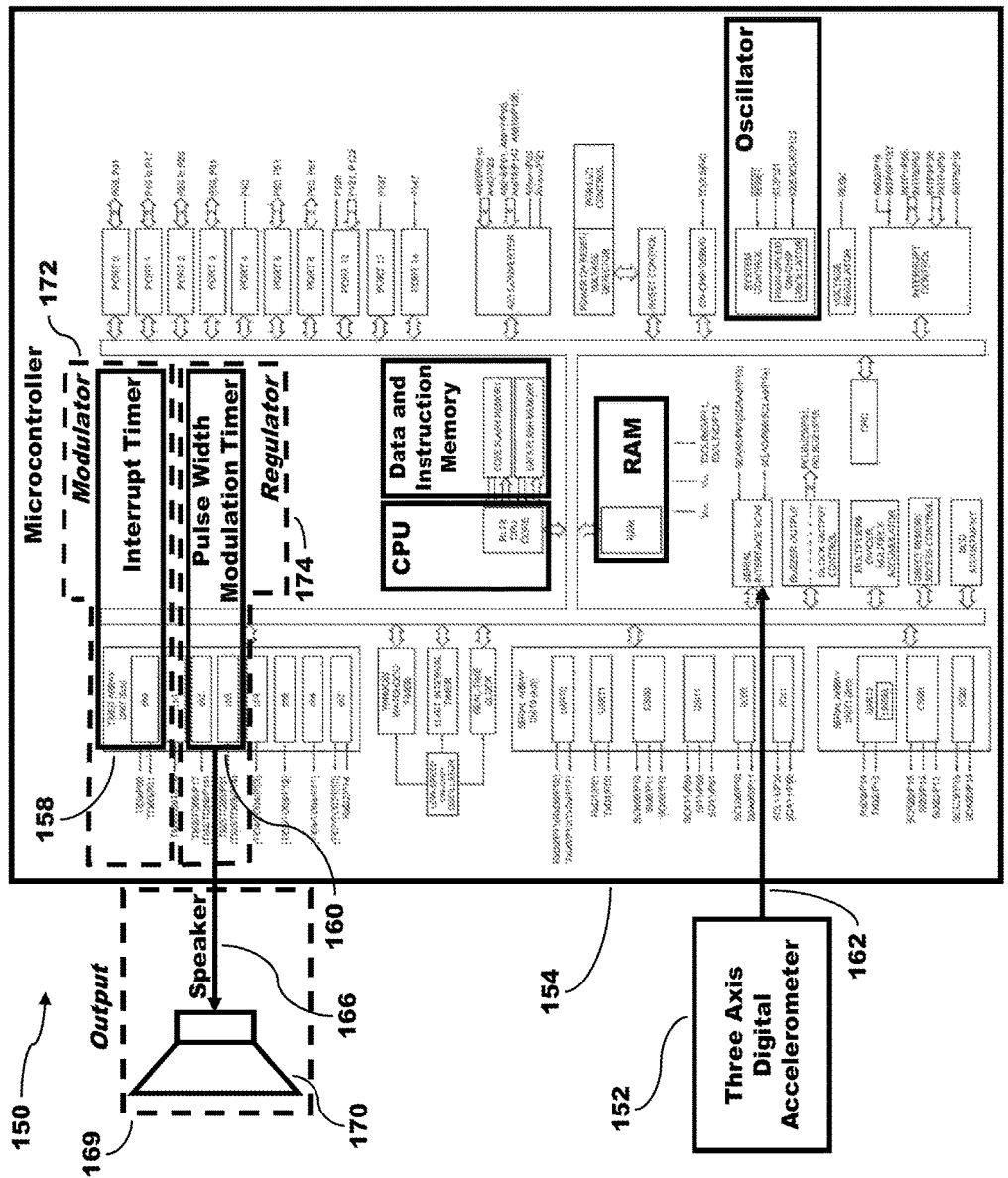
FIG. 17 is another more detailed block diagram of the alternate embodiment of the variable sound generator of FIG. 9, using a three axis digital accelerometer input to a typical microcontroller to construct the variable sound generator, showing the microcontroller in more detail.

FIG. 17 shows another more detailed block diagram of the variable sound generator 150, using a three axis digital accelerometer input to a typical microcontroller, such as the Renesas R5F100ACASP microcontroller or other suitable microcontroller to construct the variable sound generator 150, showing the microcontroller in more detail.

The microcontroller 154 of the variable sound generator 150 processes signals received from the three axis accelerometer 152, based upon motion of the variable sound generator 150 that is sensed by the three axis accelerometer 152.

The microcontroller 154 may have a three axis signal combiner 155, which may comprise a scalar to vector converter, for use in embodiments of the variable sound generator 150 that comprise analog accelerometers or other accelerometers. The scalar to vector converter converts the analog signals to digital signals for use within the microcontroller 154. Alternatively, the three axis accelerometer 152 may convert the accelerometer output signals 162 into the required digital signals for use by the microcontroller 154.

Figure 18:
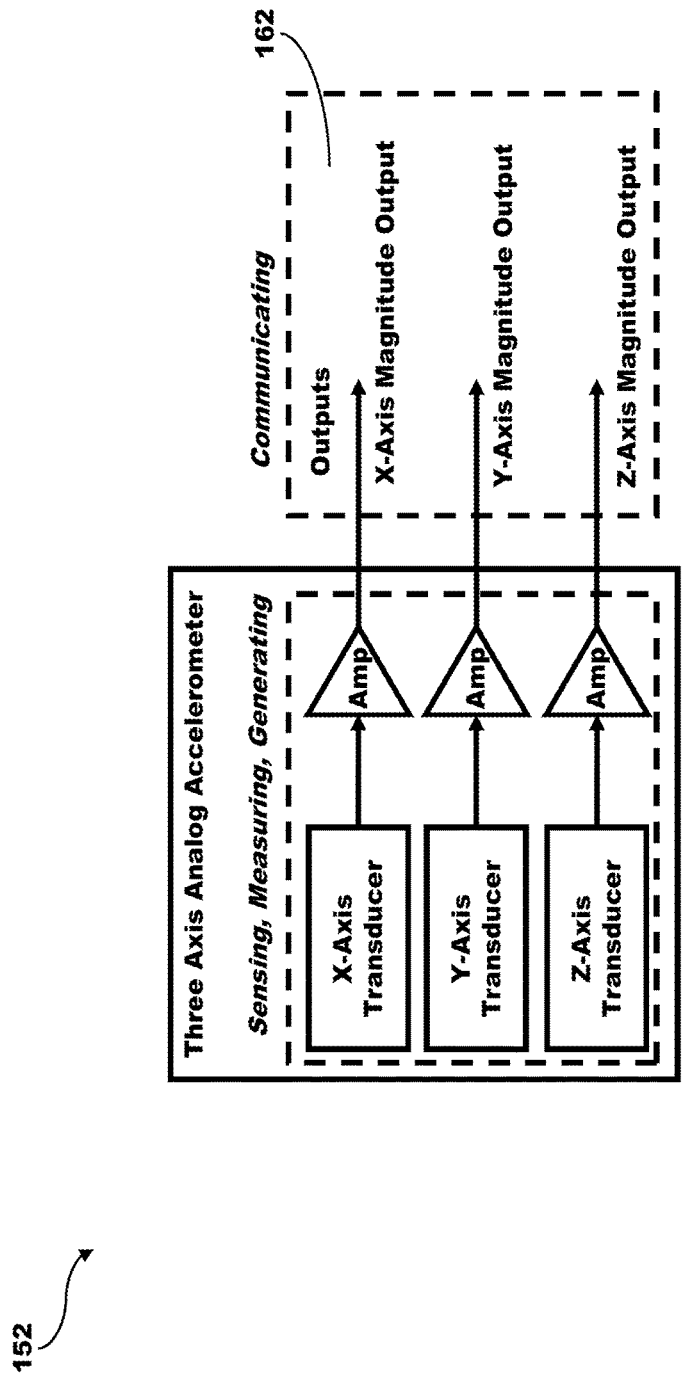
FIG. 18 is a block diagram of an accelerometer of the alternate embodiment of the variable sound generator of FIG. 9.
Figure 19:
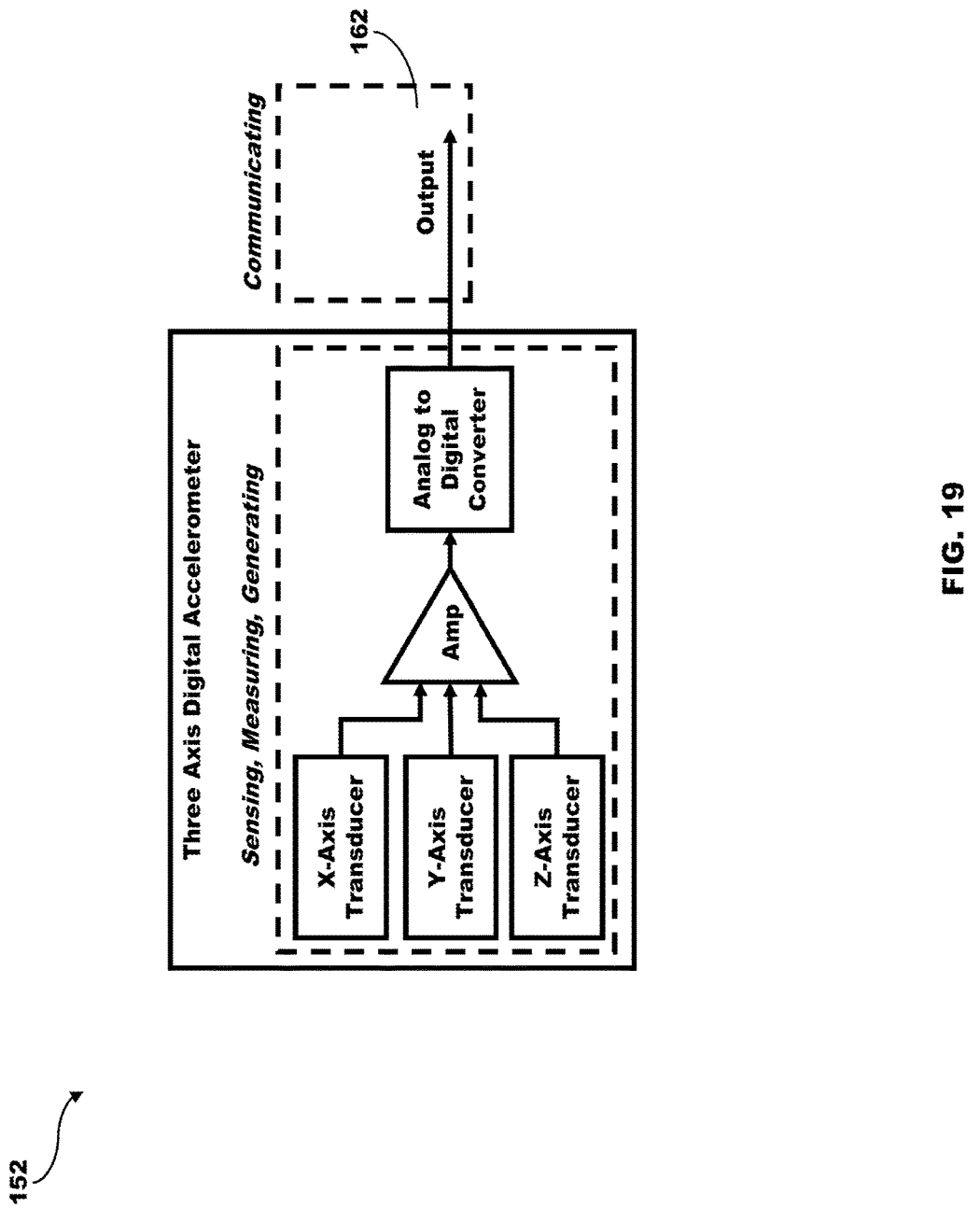
FIG. 19 is a block diagram of an alternate accelerometer of the alternate embodiment of the variable sound generator of FIG. 9.

FIG. 18 shows a block diagram of a three axis analog accelerometer that may be used to construct the accelerometer portion of the variable sound generator 150, and FIG. 19 shows a block diagram of a three axis digital accelerometer that may be used to construct the accelerometer portion of the variable sound generator 150.

Figure 20:
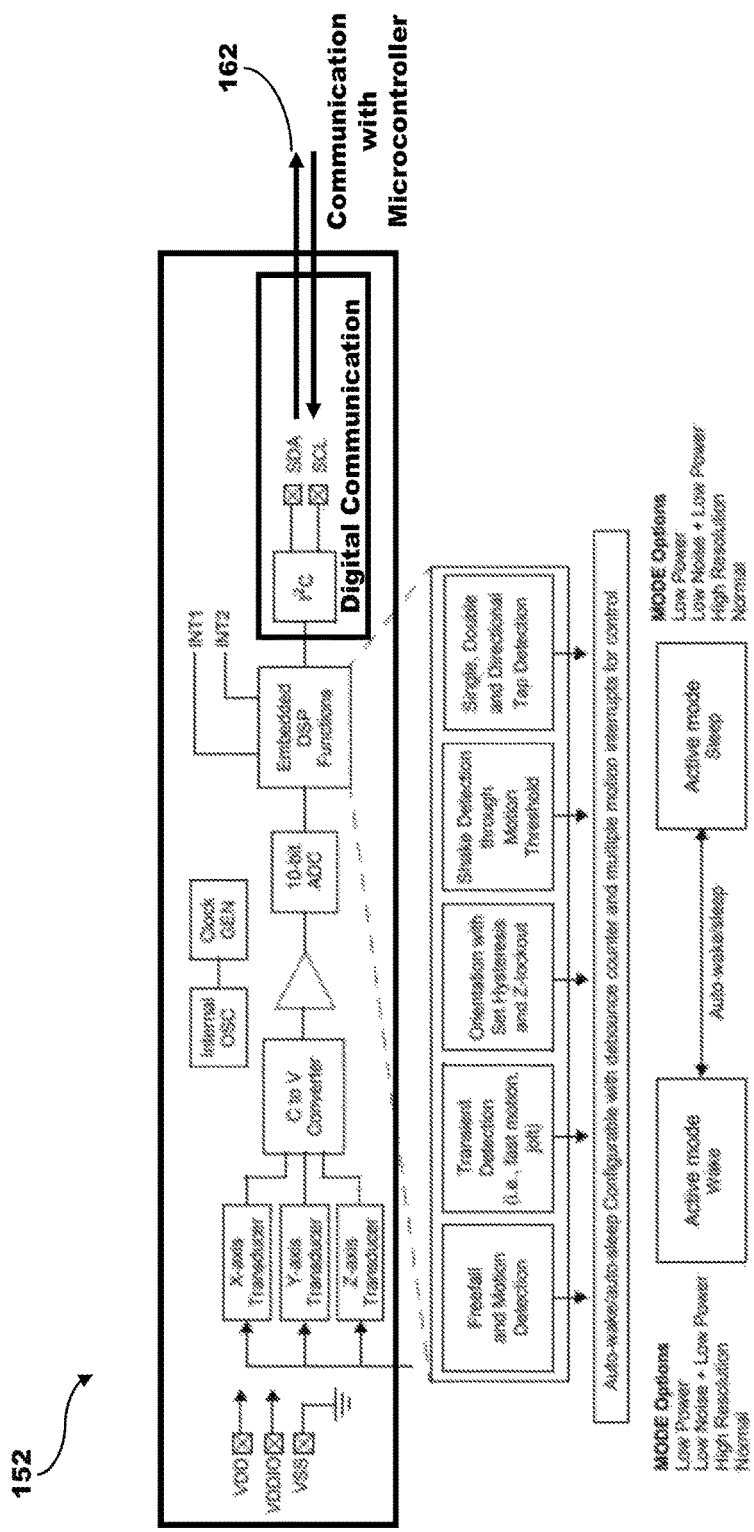
FIG. 20 is a more detailed block diagram of a typical accelerometer of the alternate embodiment of the variable sound generator of FIG. 9.

FIG. 20 shows a more detailed block diagram of an accelerometer of the variable sound generator 150, using a typical three axis accelerometer, such as a Freescale MMA8453QT or other suitable three axis digital accelerometer, to construct the accelerometer portion of the variable sound generator 150.

If the accelerometer output signals 162 are scalar signals, the accelerometer output signals 162 may be converted from scalar to vector signals, using the three axis signal combiner 155 comprising a scalar to vector converter, which represent the proper acceleration sensed on each axis of the three axes, which comprise the vector of proper acceleration, comprising magnitude of acceleration and direction of acceleration.

The microcontroller 154 may have a magnitude comparator or differentiator, which distinguishes between the magnitude of the acceleration g force vector relative to the baseline of 1 g (the apparatus at rest).

The microcontroller 154 may have a direction comparator or differentiator, which distinguishes between the direction of the acceleration g force vector relative to baselines for each of the three cartesian coordinate axes.

The microcontroller 154 receives and processes the communicated accelerometer output signals 162 into a pulse width modulation timer input signal 164, according to the magnitude and acceleration information in the accelerometer output signals 162 received from the three axis accelerometer 152.

The microcontroller 154 comprises a modulator 172 and a regulator 174. The modulator 174 comprises the interrupt timer 158, and the regulator 174 comprises the pulse width modulation timer 160. The interrupt timer 158 generates the pulse width modulation timer input signal 164, which regularly updates the duty cycle of the pulse width modulation timer 160 of the regulator 174, according to the pulse width modulation timer input signal 164 from the interrupt timer 158.

Pulse-width modulation (PWM) is used in a variety of applications, and it is often used for controlling the amplitude of digital signals, in order to control devices and applications. Pulse-width modulation (PWM) had its origins as a modulation process or technique used in communication systems for encoding the amplitude of a signal into a pulse width or duration of another signal for transmission.

A common use of pulse width modulation has been for motor speed control and/or lighting output control, which used the average value of the voltage of the pulses generated, based upon the duty cycle of the voltage fed to a motor or light.

Pulse-width modulation (PWM) plays an important role in the alternate embodiment of the variable sound generator 150 of the present invention shown in FIGS. 9-22 and is used to control the speed of playback of one or more prerecorded sounds in the variable sound generator 150, based upon acceleration of the variable sound generator 150.

The pulse width modulation timer 160 of the regulator 174 generates the pulse width modulation timer output signal 166, which drives the output 169 comprising the loudspeaker 170. The pulse width modulation timer output signal 166 comprises low and high voltage pulses in rapid succession. Each pulse varies with respect to the duration of how many clock cycles the pulse is at high voltage and the duration of how many cycles the pulse is at low voltage.

Pulse width modulation is used in the variable sound generator 150 of the present invention to control the speed of playback of one or more prerecorded sounds, based upon acceleration of the variable sound generator 150.

Pulse width modulation controls the voltage component of a digital signal that is fed to a device by controlling the cycling of on-and-off phases of the digital signal fed to the device, which varies the pulse width of the "on" phase or duty cycle of the voltage. To the device, this appears as an average voltage value, which varies according to control signals fed to the pulse width modulation timer and which is the result of the percentage of the voltage "on time". The duty cycle is expressed as the percentage of time that the voltage is one hundred percent on.

Most common microcontrollers have one or more timers. These timers typically comprise an internal clock that counts up to some number, and then goes back down to zero. Pulse width modulation (PWM) is often generated by such timers by, for example, having an external pin go high when the timer hits zero, and then go low at some other number, which can be varied, by using timer interrupts, thus varying the duty cycle of the voltage fed to the device.

In more detail, a pulse width modulation timer typically comprises a timer or counter. Although timers or counters greater than 8 bits are preferred for the present application, a typical 8-bit timer or counter, is described for here by way of example. The 8-bit timer or counter counts from 0 to 255, then restarts at 0. A switching value within the counting range anywhere between 0 and 255 could be used. If a switching vale of 127 is used, then the pulse width modulation timer outputs a high voltage from its starting value of 0, for example, up to its switching value of 127. Once the switching value is reached, the pulse width modulation outputs a low voltage.

The percentage of time the voltage is high within the counting period is called the duty cycle. A counter that counts from 0 to 255 that has a switching value of 127, has a 50% duty cycle. By simply changing the switching value, to say 63, we end up with a 25% duty cycle. Likewise, changing the switching value to 191 yields a 75% duty cycle.

Using a Pulse Width Modulation (PWM) at a constant switching cycle produces a square wave at a regular interval. For devices that cannot pick up output changes very quickly, such as analog devices and speakers, the output voltage sensed is equivalent to the Duty Cycle×High Voltage. If the High voltage is 5V, for example, for a particular circuit (low voltage is presumed to be 0, unless otherwise specified) and the duty cycle is 50%, the aforementioned types of devices would sense this as a steady 2.5V.

A steady signal might be good for keeping a light emitting diode (LED) light bulb at a pre-set brightness, but there are more interesting applications, such as motor control and sound output.

For motor control, changing the duty cycle (i.e. changing the switching value) may be achieved with some user input (e.g. knobs or buttons) or by a pre-programmed pattern.

For outputting sound of the present invention, a pulse width modulation timer may be used to modulate one or more pre-recorded sound patterns.

For a pre-programmed sound pattern to be modulated by the pulse width modulation (PWM) timer, a second timer is used to update the pulse width modulation duty cycle. This is done at regular intervals and depends upon the sampling rate of the pre-recorded sound. For example, for a sound recorded using an 8 kilohertz sampling rate, a periodic interrupt timer would update the pulse width modulation duty cycle 8,000 times per second, or once every 125 microseconds.

If the interrupt timer interval is changed so that the interrupt timer 158 updates the pulse width modulation timer duty cycle more quickly than the pre-recorded audio's native sampling rate, then the sound playback would sound as if it were sped up; if the interrupt timer 158 updates the pulse width modulation timer 160 more slowly, then the sound output would sound as if it were slowed down. This attribute is used in the variable sound generator 150 of the present invention.

Clock cycles are controlled by an oscillator that generates pulses of high voltage and low voltage at regular time intervals for purposes of synchronizing and maintaining coordination of digital signals within the variable sound generator 150.

The period of the pulse width modulation timer output signal 166 is the total number of clock cycles utilized for outputting the high voltage and the low voltage. For example, a 10 cycle period comprises 10 clock cycles split into only two pulses i.e., a high voltage pulse and a low voltage pulse.

If, for example, a 5 volt pulse width modulation timer output signal 166 comprises a 10 cycle period and has a signal of 5 volts for 8 clock cycles and 0 volts for 2 clock cycles to an analog component that senses changes in voltage slowly, such as a loudspeaker, the loudspeaker would act as if it were receiving a constant 4 volt signal (5 volts×8 clock cycles+0 volts×2 clock cycles). The percentage of each period that the signal is at high-voltage is known as the Duty Cycle. If the Duty Cycle changes, the voltage sensed by similar analog components changes proportionally.

A simple low-pass filter comprising a resistor and capacitor can be constructed to smooth the pulse width modulation timer output signal 166 fed to the loudspeaker 170, as required if the loudspeaker 170 senses the pulses of voltage instead of the intended corresponding analog signal.

The fidelity of the audio output from the loudspeaker 170 is dependent upon pulse width modulation oscillator frequency and should preferably be at least twice the highest audio frequency intended to be produced, in order to minimize distortion in audio output.

Storing the at least one stored sound 156 in digital memory allows the originally recorded analog sound to be reproduced with clarity.

Analog sounds are produced and played back at different speeds, based upon the digital representations of those sounds, by varying the duty cycle of the at least one stored sound 156 across pulse width modulation cycles.

The duty cycle of the pulse width modulation timer output signal 166, which drives the loudspeaker 170, is updated at a rate consistent with the sampling rate of the originally recorded sound to reproduce the sound with reasonable quality in its original form.

If the duty cycle is updated more quickly than the sampling rate of the originally recorded sound, the originally recorded sound will be output at its completion in a shorter elapsed time and at a higher perceived pitch, thereby speeding up the playback speed.

If, on the other hand, the duty cycle is updated more slowly than the sampling rate of the originally recorded sound, the originally recorded sound will be output at its completion in a longer elapsed time and at a lower perceived pitch, thereby speeding up the playback speed.

In effect, the frequency at which the duty cycle is updated impacts the characteristics of the played back pre-recorded sound, by compressing or expanding the analog sound waves being produced at the output.

In more detail, pulse-width modulation (PWM) had its origins as a modulation process or technique used in communication systems for encoding the amplitude of a signal into a pulse width or duration of another signal for transmission.

A pulse width modulation timer, such as the pulse width modulation timer 160 of the present invention, may be used to generate and deliver a pulse width modulated signal. Pulse width modulation may be accomplished at signal levels typically used by microcontrollers at levels from 0 to 5 volts. High voltage pulses are typically considered to be 5 volt pulses, and low voltage pulses are typically being considered to be 0 volt pulses. These pulses may be used to approximate an analog signal output by switching between the high and low voltage signals rapidly, such that if the signal were composed of 50% 5 volt pulses and 50% 0 volt pulses over 1 second, the analog voltage sensed would be 50% of the high voltage potential, or 2.5 volts. Other voltages may, however, be used depending upon circuit requirements. The proportion of time the pulse width modulation signal is at high voltage is known as the Duty Cycle.

A prerecorded sound having a two second elapsed play time and recorded using a sampling rate of 8 kilohertz, for example, is stored in digital memory utilizing 16,000 sound samples (8,000 samples per second of play time×2 seconds of play time).

When the duty cycle modulation rate, i.e., the modulation rate of the duty cycle of the pulse width modulation timer 160 is, for example, 8,000 times per second, using each sound sample of the prerecorded sound in succession, the pulse width modulation timer 160 generates the pulse width modulation timer output signal 166 for a duration of two seconds. The pulse width modulation timer output signal 166, approximates an analog signal approximation of the originally pre-recorded sound, which is fed to the loudspeaker 170. The entire pre-recorded sound (in this case the at least one stored sound 156) is played back for a duration of two seconds.

When the duty cycle modulation rate, i.e., the modulation rate of the duty cycle of the pulse width modulation timer 160 is, for example, 16,000 times per second, using each sound sample of the prerecorded sound in succession, the pulse width modulation timer 160 generates the pulse width modulation timer output signal 166 for a duration of one second. The entire pre-recorded sound (in this case the at least one stored sound 156) is played back for a duration of one second.

FIG. 21 shows a flow chart of a process of the alternate embodiment of the variable sound generator 150, which may be used to process the magnitude of acceleration of the variable sound generator 150.

FIG. 22 shows a flow chart of another process of the alternate embodiment of the variable sound generator 150, which may be used to process the magnitude of acceleration and the direction of acceleration of the variable sound generator 150.

Since the entire pre-recorded sound (the at least one stored sound 156) is played back in one half the time, when the duty cycle modulation rate, i.e., the modulation rate of the duty cycle of the pulse width modulation timer 160 is changed to 16,000 times per second compared to when the duty cycle modulation rate is 8,000 times per second, the entire pre-recorded sound then is played back twice as fast.

When the duty cycle modulation rate is 16,000 times per second compared to when the duty cycle modulation rate is 8,000 times per second, the perceived pitch of the sound that is played back increases to a listener, because of the shorter elapsed time of playback.

The reverse is also true, i.e., by decreasing the duty cycle modulation rate, the perceived pitch of the sound that is played back decreases to a listener, because of the longer elapsed time of playback.

Thus, when acceleration of the three axis accelerometer 152 increases, the duty cycle modulation rate, i.e., the modulation rate of the duty cycle of the pulse width modulation timer 160 increases and the perceived pitch of the sound that is played back increases to a listener, because of the shorter elapsed time of playback.

Alternatively, when acceleration of the three axis accelerometer 152 decreases, the duty cycle modulation rate, i.e., the modulation rate of the duty cycle of the pulse width modulation timer 160 decreases and the perceived pitch of the sound that is played back decreases to a listener, because of the longer elapsed time of playback.

Again, the pulse width modulation timer 160 regulates the playback speed 168 of the at least one stored sound 156 according to the pulse width modulation timer output signal 166, which comprises:
  varying the playback speed 168, by the pulse width modulation timer 160, according to the magnitude of acceleration and/or the direction of acceleration, comprising:
    increasing, by the pulse width modulation timer 160, the playback speed 168 when the magnitude of acceleration increases and
    decreasing, by the pulse width modulation timer 160, the playback speed 168 when the magnitude of acceleration decreases; and/or
    increasing, by the pulse width modulation timer, the playback speed when change in the direction of acceleration increases and
    decreasing, by the pulse width modulation timer 160, the playback speed when the change in the direction of acceleration decreases.

In yet another alternate embodiment of the present invention which is substantially the same as the variable sound generator 150, the pulse width modulation timer 160 regulates the playback speed 168 of the at least one stored sound 156 according to how many of the accelerometer output signals 162 received from the three axis accelerometer 152 exceed one or more predetermined thresholds in lieu of and/or in addition to varying the playback speed 168, by the pulse width modulation timer 160, according to the magnitude of acceleration and/or the direction of acceleration.

Although the present invention has been described in considerable detail with reference to certain preferred versions thereof, other versions are possible. Therefore, the spirit and scope of the appended claims should not be limited to the description of the preferred versions contained herein.

What is claimed is:

1. A process executing on a three axis acceleration sensitive sound producing apparatus, comprising a three axis accelerometer and a microcontroller, the microcontroller comprising at least one stored sound, an interrupt timer and a pulse width modulation timer, the process executed by motion of the apparatus sensed by the three axis accelerometer, comprising the steps of:
  (a) sensing, by said three axis accelerometer, said motion of said apparatus;
  (b) measuring, by said three axis accelerometer, acceleration associated with said sensed motion in each direction of three directions;
  (c) generating, by said three axis accelerometer, accelerometer output signals, comprising acceleration information, comprising magnitude of acceleration, and direction information associated with said measured sensed motion in said each direction of said three directions;
  (d) communicating, by said three axis accelerometer, said generated accelerometer output signals to said microcontroller;
  (e) receiving and processing, by said microcontroller, said communicated accelerometer output signals into a pulse width modulation timer input signal, according to said magnitude of acceleration;
  (f) modulating, by said interrupt timer, said pulse width modulation timer according to said pulse width modulation timer input signal,
    generating, by said pulse width modulation timer, a pulse width modulation timer output signal;
  (g) regulating, by said pulse width modulation timer, playback speed of said at least one stored sound according to said pulse width modulation timer output signal, resulting in a regulated playback speed, comprising:
    varying said playback speed, by said pulse width modulation timer, according to said magnitude of acceleration, comprising:
      increasing, by said pulse width modulation timer, said playback speed when said magnitude of acceleration increases and
      decreasing, by said pulse width modulation timer, said playback speed when said magnitude of acceleration decreases;
  (h) playing back, by said microcontroller, said at least one stored sound according to said regulated playback speed.

2. The process of claim 1, wherein step (f) further comprises:
  modulating, by said interrupt timer, duty cycle of said pulse width modulation timer.

3. The process of claim 1, wherein:
step (f) further comprises:
  modulating, by said interrupt timer, duty cycle of said pulse width modulation timer;
step (g) further comprises:
  regulating, by said pulse width modulation timer, said playback speed of said at least one stored sound to be played back in step (h) according to duty cycle modulation rate of said pulse width modulation timer.

4. The process of claim 1, wherein step (f) further comprises:
  modulating, by said interrupt timer, duty cycle modulation rate of said pulse width modulation timer.

5. The process of claim 1, wherein:
step (f) further comprises:
  modulating, by said interrupt timer, duty cycle modulation rate of said pulse width modulation timer;
step (g) further comprises:
  regulating, by said pulse width modulation timer, said playback speed of said at least one stored sound to be played back in step (h) according to said duty cycle modulation rate.

6. The process of claim 1, wherein:
said three axis acceleration sensitive sound producing apparatus further comprises a substantially spherical housing, containing said three axis accelerometer and said microcontroller.

7. The process of claim 1, wherein step (g) further comprises:
  regulating, by said pulse width modulation timer, playback speed in real time according to said magnitude of acceleration.

8. The process of claim 1, wherein step (h) further comprises:
  playing back, by said microcontroller, said at least one stored sound according to said regulated playback speed via a loudspeaker.

9. A process executing on a three axis acceleration sensitive sound producing apparatus, comprising a three axis accelerometer and a microcontroller, the microcontroller comprising at least one stored sound, an interrupt timer and a pulse width modulation timer, the process executed by motion of the apparatus sensed by the three axis accelerometer, comprising the steps of:

(a) sensing, by said three axis accelerometer, said motion of said apparatus;

(b) measuring, by said three axis accelerometer, acceleration associated with said sensed motion in each direction of three directions;

(c) generating, by said three axis accelerometer, accelerometer output signals, comprising acceleration information, comprising magnitude of acceleration, and direction of acceleration associated with said measured sensed motion in said each direction of said three directions;

(d) communicating, by said three axis accelerometer, said generated accelerometer output signals to said microcontroller;

(e) receiving and processing, by said microcontroller, said communicated accelerometer output signals into a pulse width modulation timer input signal, according to said direction of acceleration;

(f) modulating, by said interrupt timer, said pulse width modulation timer according to said pulse width modulation timer input signal,
generating, by said pulse width modulation timer, a pulse width modulation timer output signal;

(g) regulating, by said pulse width modulation timer, playback speed of said at least one stored sound according to said pulse width modulation timer output signal, resulting in a regulated playback speed, comprising:
varying said playback speed, by said pulse width modulation timer, according to said direction of acceleration, comprising:
increasing, by said pulse width modulation timer, said playback speed when change in said direction of acceleration increases and
decreasing, by said pulse width modulation timer, said playback speed when said change in said direction of acceleration decreases;

(h) playing back, by said microcontroller, said at least one stored sound according to said regulated playback speed.

10. The process of claim 9, wherein step (f) further comprises:
modulating, by said interrupt timer, duty cycle of said pulse width modulation timer.

11. The process of claim 9, wherein:
step (f) further comprises:
modulating, by said interrupt timer, duty cycle of said pulse width modulation timer;
step (g) further comprises:
regulating, by said pulse width modulation timer, said playback speed of said at least one stored sound to be played back in step (h) according to duty cycle modulation rate of said pulse width modulation timer.

12. The process of claim 9, wherein step (f) further comprises:
modulating, by said interrupt timer, duty cycle modulation rate of said pulse width modulation timer.

13. The process of claim 9, wherein:
step (f) further comprises:
modulating, by said interrupt timer, duty cycle modulation rate of said pulse width modulation timer;

step (g) further comprises:
regulating, by said pulse width modulation timer, said playback speed of said at least one stored sound to be played back in step (h) according to said duty cycle modulation rate.

14. The process of claim 9, wherein:
said three axis acceleration sensitive sound producing apparatus further comprises a substantially spherical housing, containing said three axis accelerometer and said microcontroller.

15. The process of claim 9, wherein step (g) further comprises:
regulating, by said pulse width modulation timer, playback speed in real time according to said direction of acceleration.

16. The process of claim 9, wherein step (h) further comprises:
playing back, by said microcontroller, said at least one stored sound according to said regulated playback speed via a loudspeaker.

17. A process executing on a three axis acceleration sensitive sound producing apparatus, comprising a three axis accelerometer and a microcontroller, the microcontroller comprising at least one stored sound, an interrupt timer and a pulse width modulation timer, the process executed by motion of the apparatus sensed by the three axis accelerometer, comprising the steps of:

(a) sensing, by said three axis accelerometer, said motion of said apparatus;

(b) measuring, by said three axis accelerometer, acceleration associated with said sensed motion in each direction of three directions;

(c) generating, by said three axis accelerometer, accelerometer output signals, comprising acceleration information, comprising magnitude of acceleration, and direction of acceleration associated with said measured sensed motion in said each direction of said three directions;

(d) communicating, by said three axis accelerometer, said generated accelerometer output signals to said microcontroller;

(e) receiving and processing, by said microcontroller, said communicated accelerometer output signals into a pulse width modulation timer input signal, according to said magnitude of acceleration and said direction of acceleration;

(f) modulating, by said interrupt timer, said pulse width modulation timer according to said pulse width modulation timer input signal,
generating, by said pulse width modulation timer, a pulse width modulation timer output signal;

(g) regulating, by said pulse width modulation timer, playback speed of said at least one stored sound according to said pulse width modulation timer output signal, resulting in a regulated playback speed, comprising:
varying said playback speed, by said pulse width modulation timer, according to said magnitude of acceleration and said direction of acceleration, comprising:
increasing, by said pulse width modulation timer, said playback speed when said magnitude of acceleration increases and
decreasing, by said pulse width modulation timer, said playback speed when said magnitude of acceleration decreases; and increasing, by said pulse width modulation timer, said playback speed when change in said direction of acceleration increases and decreasing, by said pulse width modulation timer, said playback speed when said change in said direction of acceleration decreases;

(h) playing back, by said microcontroller, said at least one stored sound according to said regulated playback speed.

18. The process of claim 17, wherein step (f) further comprises:

modulating, by said interrupt timer, duty cycle of said pulse width modulation timer.

19. The process of claim 17, wherein:

step (f) further comprises:

modulating, by said interrupt timer, duty cycle of said pulse width modulation timer;

step (g) further comprises:

regulating, by said pulse width modulation timer, said playback speed of said at least one stored sound to be played back in step (h) according to duty cycle modulation rate of said pulse width modulation timer.

20. The process of claim 17, wherein step (f) further comprises:

modulating, by said interrupt timer, duty cycle modulation rate of said pulse width modulation timer.

21. The process of claim 17, wherein:

step (f) further comprises:

modulating, by said interrupt timer, duty cycle modulation rate of said pulse width modulation timer;

step (g) further comprises:

regulating, by said pulse width modulation timer, said playback speed of said at least one stored sound to be played back in step (h) according to said duty cycle modulation rate.

22. The process of claim 17, wherein:

said three axis acceleration sensitive sound producing apparatus further comprises a substantially spherical housing, containing said three axis accelerometer and said microcontroller.

23. The process of claim 17, wherein step (g) further comprises:

regulating, by said pulse width modulation timer, playback speed in real time according to said magnitude of acceleration and said direction of acceleration.

24. The process of claim 17, wherein step (h) further comprises:

playing back, by said microcontroller, said at least one stored sound according to said regulated playback speed via a loudspeaker.

* * * * *